United States Patent
Bickham et al.

(10) Patent No.: US 11,119,270 B2
(45) Date of Patent: Sep. 14, 2021

(54) PUNCTURE-RESISTANT REDUCED-DIAMETER MULTIMODE OPTICAL FIBER

(71) Applicant: CORNING INCORPORATED, Corning, NY (US)

(72) Inventors: Scott Robertson Bickham, Corning, NY (US); Yangbin Chen, Lake Elmo, MN (US); Ching-Kee Chien, Horseheads, NY (US); Ming-Jun Li, Horseheads, NY (US); Pushkar Tandon, Painted Post, NY (US); Ruchi Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/793,063

(22) Filed: Feb. 18, 2020

(65) Prior Publication Data
US 2020/0271858 A1 Aug. 27, 2020

Related U.S. Application Data

(60) Provisional application No. 62/809,234, filed on Feb. 22, 2019.

(51) Int. Cl.
*G02B 6/028* (2006.01)
*G02B 6/02* (2006.01)

(52) U.S. Cl.
CPC ......... *G02B 6/0288* (2013.01); *G02B 6/0281* (2013.01); *G02B 6/02395* (2013.01)

(58) Field of Classification Search
None
See application file for complete search history.

(56) References Cited

U.S. PATENT DOCUMENTS

| 6,316,516 | B1 | 11/2001 | Chien et al. |
| 6,563,996 | B1 | 5/2003 | Winningham |
| 8,600,206 | B2 | 12/2013 | Overton |
| 9,804,326 | B2 | 10/2017 | Bickham et al. |

(Continued)

FOREIGN PATENT DOCUMENTS

WO WO 2018/102292 A1 * 6/2018

OTHER PUBLICATIONS

Baldauf et al; "Relationship of Mechanical Characteristics of Dual Coated Single Mode Optical Fibers and Microbending Loss", IEICE Transactions on Communications, vol. E76-B, No. 4, pp. 352-357 (1993).

(Continued)

*Primary Examiner* — Jerry Rahll
(74) *Attorney, Agent, or Firm* — Kevin L. Bray

(57) ABSTRACT

The present description provides reduced-diameter multimode optical fibers. The optical fibers include a reduced-diameter glass fiber and/or reduced-thickness coatings. The overall diameter of the optical fibers is less than 210 μm and examples with diameters less than 160 μm are presented. Puncture resistant secondary coatings enable thinning of the secondary coating without compromising protection of the glass fiber. The optical fibers are suitable for data center applications and features high modal bandwidth, low attenuation, low microbending sensitivity, and puncture resistance in a compact form factor.

20 Claims, 8 Drawing Sheets

(56) References Cited

U.S. PATENT DOCUMENTS

2011/0135262 A1 6/2011 Molin et al.
2012/0275751 A1 11/2012 Krabshuis et al.
2014/0341521 A1 11/2014 Fabian et al.
2018/0127593 A1* 5/2018 Chen .................... G02B 1/14
2019/0293887 A1 9/2019 Bookbinder et al.
2019/0331850 A1 10/2019 Bennett et al.

OTHER PUBLICATIONS

Glaesemann et al; "Quantifying the Puncture Resistance of Optical Fiber Coatings"; Published in the Proceedings of the 52nd International Wire & Cable Symposium, pp. 237-245 (2003).
Nelder et al; "A Simplex Method for Function Minimization," Computer Journal 7: 308-313 (1965).
International Search Report and Written Opinion of the International Searching Authority; PCT/US2020/016498; dated Apr. 22, 2020; 9 Pages; European Patent Office.

* cited by examiner

PUNCTURE-RESISTANT REDUCED-DIAMETER MULTIMODE OPTICAL FIBER

This application claims the benefit of priority to U.S. Provisional Application Ser. No. 62/809,234 filed on Feb. 22, 2019, the content of which is relied upon and incorporated herein by reference in its entirety.

FIELD OF THE DISCLOSURE

This disclosure pertains to optical fibers. More particularly, this disclosure pertains to multimode optical fibers. Most particularly, this disclosure relates to multimode optical fibers with reduced diameter that feature high modal bandwidth and high puncture resistance.

BACKGROUND OF THE DISCLOSURE

Data centers (DCs) are continually striving to meet the challenge of delivering more bandwidth, and a key part of that endeavor will be the deployment of higher capacity interconnects and cables with higher bandwidth density. Proposed technologies for achieving an increase in capacity include higher line rates, advanced modulation formats, wavelength division multiplexing, spatial division multiplexing and reduced diameter fibers.

Optical fibers with reduced diameters are attractive for reducing the size of cables for a given optical fiber count, increasing the optical fiber count of cables of a given diameter, decreasing cable cost, efficiently using existing infrastructure for upgrading cable installations, and reducing the footprint of new cable installations.

An optical fiber includes a waveguiding glass fiber surrounded by a coating. The glass fiber includes a higher index core region surrounded by a lower index cladding region. The coating typically includes a soft (low modulus) primary coating in contact with the glass fiber and a hard (high modulus) secondary coating that surrounds and contacts the primary coating. The secondary coating provides mechanical integrity and allows the optical fiber to be handled for processing and installation in cables, while the primary coating acts to dissipate external forces to prevent them from being transferred to the glass fiber. By dampening external forces, the primary coating prevents damage to the glass fiber and minimizes attenuation of optical signals caused by microbending.

Strategies for reducing the diameter of optical fibers include reducing the diameter of the glass fiber and reducing the thickness of the primary and/or secondary coating. These strategies, however, lead to compromises in the performance of the optical fiber. A smaller cladding diameter tends to increase the microbending sensitivity and to increase attenuation of the optical signal propagating in the core. Decreasing the cladding diameter from 125 µm to 90 µm, for example, leads to an increase in microbending sensitivity by about an order of magnitude in current optical fiber designs. Thinner primary coatings are more susceptible to shear-induced defects during processing, while thinner secondary coatings are more susceptible to punctures.

Multimode optical fibers are widely used in data centers. To achieve higher capacity in data centers it is desirable to develop multimode optical fibers with reduced diameter. Efforts to date to reduce the diameter of multimode fibers have achieved limited success. There remains a need for multimode fibers with reduced diameters for data center applications. In particular, there is a need for reduced-diameter multimode optical fibers that can be incorporated into higher fiber count cables and terminated with higher density connectors. The reduced-diameter multimode optical fibers must maintain the high modal bandwidths needed for high transmission capacity in data centers and must have coatings that are optimized to mitigate microbending without sacrificing puncture resistance and other mechanical properties.

SUMMARY

The present description provides a reduced-diameter multimode optical fiber. The reduced-diameter multimode optical fiber is suitable for data center applications and features high modal bandwidth, low attenuation, low microbending sensitivity, and puncture resistance in a compact form factor.

The present description extends to:
An optical fiber comprising:
a multimode glass fiber, the multimode glass fiber including a core region with a radius $r_1$ in the range from 17.5 µm to 32.5 µm and a cladding region with a radius $r_4$ greater than or equal to 60.0 µm;
a primary coating with a radius $r_5$ surrounding and directly adjacent to the cladding region, the primary coating having a thickness $r_5-r_4$ less than 30.0 µm and an in situ modulus less than 0.30 MPa; and
a secondary coating with a radius $r_6$ less than or equal to 110.0 µm surrounding and directly adjacent to the primary coating; the secondary coating having a thickness $r_6-r_5$ less than or equal to 30.0 µm and a normalized puncture load greater than $3.6 \times 10^{-4}$ g/µm²;
wherein the optical fiber has a minimum effective modal bandwidth (minEMB) greater than 2000 MHz-km at one or more wavelengths selected from the group consisting of 850 nm, 980 nm, and 1060 nm.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
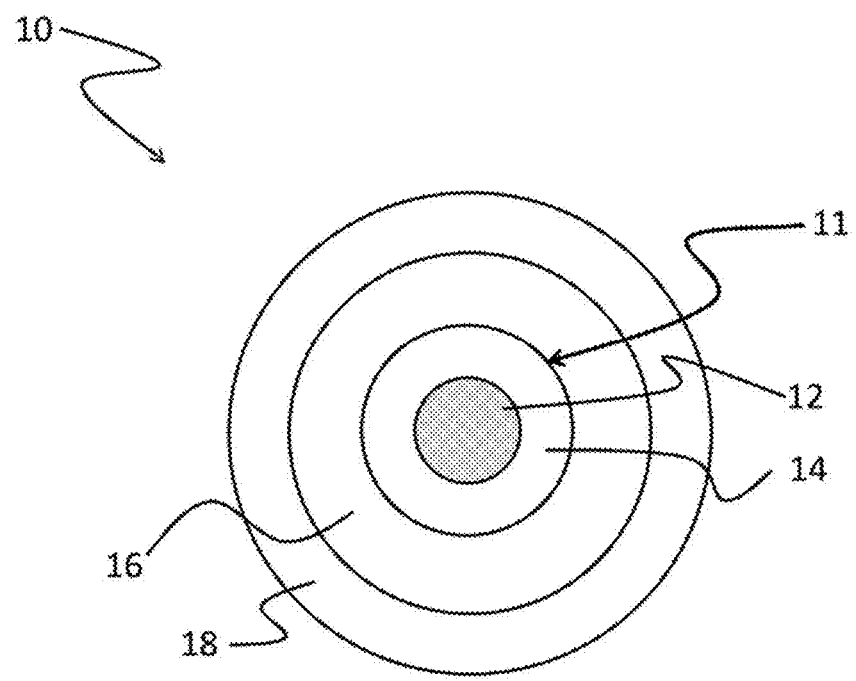
FIG. 1 is a schematic view of a coated optical fiber according one embodiment.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims which follow, reference will be made to a number of terms which shall be defined to have the following meanings:

"Include," "includes," "including", or like terms means encompassing but not limited to, that is, inclusive and not exclusive.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is said to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

Directional terms as used herein—for example up, down, right, left, front, back, top, bottom-are made only with reference to the figures as drawn and the coordinate axis provided therewith and are not intended to imply absolute orientation.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but do touch an intervening material or series of intervening materials, where the intervening material or at least one of the series of intervening materials touches the other. Elements in contact may be rigidly or non-rigidly joined. Contacting refers to placing two elements in direct or indirect contact. Elements in direct (indirect) contact may be said to directly (indirectly) contact each other.

As used herein, "directly adjacent" means directly contacting and "indirectly adjacent" mean indirectly contacting. The term "adjacent" encompasses elements that are directly or indirectly adjacent to each other.

"Optical fiber" refers to a waveguide having a glass portion surrounded by a coating. The glass portion includes a core and a cladding, and is referred to herein as a "glass fiber".

"Radial position", "radius", or the radial coordinate "r" refers to radial position relative to the centerline (r=0) of the fiber.

The term "mode" refers to guided mode. A single-mode fiber is an optical fiber designed to support only the fundamental LP01 modes over a substantial length of the optical fiber (e.g., at least several meters), but that under certain circumstances can support multiple modes over short distances (e.g., tens of centimeters). We assume that the birefringence of the fiber is sufficiently low to assume that the two orthogonally polarized components of the LP01 mode are degenerate and propagate with the same phase velocity. A multimode optical fiber is an optical fiber designed to support the fundamental LP01 modes and at least one higher-order $LP_{nm}$ mode over a substantial length of the optical fiber, at a designated operating wavelength $\lambda_{op}$, where either n≠0 or m≠1.

The "operating wavelength," $\lambda_{op}$, of an optical fiber is the wavelength at which the optical fiber is operated. The operating wavelength corresponds to the wavelength of a guided mode. Representative operating wavelengths include 850 nm, 980 nm, 1060 nm, 1310 nm and 1550 nm, which are commonly used in telecommunications systems, optical data links, and data centers. Although a particular operating wavelength may be specified for an optical fiber, it is understood that a particular optical fiber can operate at multiple operating wavelengths and/or over a continuous range of operating wavelengths. Characteristics such as modal bandwidth and mode field diameter may vary with the operating wavelength and the relative refractive index profile of a particular optical fiber may be designed to provide optimal performance at a particular operating wavelength, a particular combination of operating wavelengths, or particular continuous range of operating wavelengths.

When a pulse of light is launched into a multimode fiber, it gradually spreads, or broadens, over time as it propagates through the multimode fiber from an input position to an output position. Due to the spreading, the characteristics of the pulse varies along the multimode fiber and the output pulse differs from the input pulse. The term "bandwidth" is used to quantify spreading of a pulse of light in a multimode fiber. The bandwidth is determined from a ratio of the Fourier transform of an output pulse to the Fourier transform of the input pulse. More specifically, if the input pulse is described by an intensity distribution $I_{in}(t)$ and the output pulse is described by an intensity distribution $I_{out}(t)$, an amplitude ratio can be defined as:

$$\text{Amplitude Ratio} = \frac{|H_{out}(f)|}{|H_{in}(f)|} \qquad (1)$$

where f is frequency, $H_{out}(f)$ is the Fourier transform of $I_{out}(t)$, and $H_{in}(f)$ is the Fourier transform of $I_{in}(t)$. The bandwidth is defined as the frequency at which the amplitude ratio defined in Eq. (1) first decreases to 0.5. For a Gaussian output pulse $I_{out}(t)$ with a standard deviation of σ ns/km, the bandwidth is approximately 0.19/σ GHz-km.

The "modal bandwidth" of a multimode fiber is the contribution to bandwidth attributable to modal dispersion. "Modal dispersion" refers to time delay differences between different mode groups. Other contributions to bandwidth, such as chromatic dispersion, are excluded from the modal bandwidth. Modal bandwidth depends on the relative power of the different mode groups and the relative time delay between the different mode groups. Since modal bandwidth depends not only on the relative delays of different mode groups, but also on their relative power, it depends on launch conditions. For example, an "overfilled launch," where an equal amount of power is launched into each of the individual mode groups, may result in a different measured or calculated modal bandwidth than a launch from a specific light source (e.g. laser diode or VCSEL) that delivers unequal powers to different mode groups.

The "effective modal bandwidth" or "EMB" of a fiber refers to modal bandwidth under a specific launch condition. EMB combines mode group delays, which are determined by the refractive index profile of the fiber and the power coupled in the mode groups, which is an attribute of the specific launch condition (for example, a launch condition from a specific source (e.g. VCSEL laser) or a specific distribution of power.

The term "EMBc" (or "calculated EMB") refers to constructing an output pulse using a weighted sum of DMD (differential mode delay) pulses. A single DMD for a fiber can be used to simulate the effect of different lasers by using different weighting functions. The term "minEMBc" (or "minimum calculated EMB") refers to the minimum EMBc of a set of 10 EMBc's generated with 10 different weighting functions as standardized by TIA/EIA 455-220A and IEC 60793-1-49. The minEMBc values are determined from DMD measurements and are related to the EMB by a factor of 1.13 (i.e., minEMB=1.13×minEMBc).

The terms "bandwidth" and "modal bandwidth" are generic in the sense that they can refer to different or arbitrary launch conditions. The term "effective modal bandwidth", in contrast, refers to a specific launch condition defined with particularity. A person of skill in the art is familiar with the terms and can deduce from the context which term is intended. For example, a discussion of any of the terms bandwidth, modal bandwidth, effective modal bandwidth, or calculated effective modal bandwidth in the context of a standard refers to the meaning of the term as defined by the standard. As used herein, unless otherwise specified or clear from context, the terms "bandwidth," "modal bandwidth" and "effective modal bandwidth" refer to the OFL bandwidth according to the TIA/EIA 455-204 and IEC 60793-1-41 standards.

"Refractive index" refers to the refractive index at a wavelength of 850 nm.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. Δ or Δ%) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined by Eq. (2) below, unless otherwise specified. Whether by design or a consequence of normal manufacturing variability, the dependence of relative refractive index on radial position may be sloped, curved, or otherwise non-constant.

"Relative refractive index," as used herein, is defined in Eq. (2) as:

$$\Delta_i(r_i)\% = 100\frac{(n_i^2 - n_{ref}^2)}{2n_i^2} \qquad (2)$$

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass. As used herein, the relative refractive index is represented by Δ (or "delta") or Δ% (or "delta %") and its values are given in units of "%", unless otherwise specified. Relative refractive index may also be expressed as Δ(r) or Δ(r) %.

The average relative refractive index ($\Delta_{ave}$) of a region of the fiber is determined from Eq. (3):

$$\Delta_{ave} = \int_{r_{inner}}^{r_{outer}} \frac{\Delta(r)dr}{(r_{outer} - r_{inner})} \quad (3)$$

where $r_{inner}$ is the inner radius of the region, $r_{outer}$ is the outer radius of the region, and $\Delta(r)$ is the relative refractive index of the region.

The term "α-profile" or "alpha profile" refers to a relative refractive index profile $\Delta(r)$ that has the functional form defined in Eq. (4):

$$\Delta(r) = \Delta(r_0)\left[1 - \left[\frac{|r - r_0|}{(r_z - r_0)}\right]^{\alpha}\right] \quad (4)$$

where $r_o$ is the radial position at which $\Delta(r)$ is maximum, $\Delta(r_0) > 0$, $r_z > r_0$ is the radial position at which $\Delta(r)$ decreases to its minimum value, and r is in the range $r_i \leq r \leq r_f$, where $r_i$ is the initial radial position of the α-profile, $r_f$ is the final radial position of the α-profile, and α is a real number. $\Delta(r_0)$ for an α-profile may be referred to herein as $\Delta_{max}$ or, when referring to a specific region i of the fiber, as $\Delta_{imax}$. When the relative refractive index profile of the fiber core region is described by an α-profile with $r_0$ occurring at the centerline (r=0), $r_z$ corresponding to the outer radius $r_1$ of the core region, and $\Delta_1(r_1)=0$, Eq. (3) simplifies to Eq. (5):

$$\Delta_1(r) = \Delta_{1max}\left[1 - \left[\frac{r}{r_1}\right]^{\alpha}\right] \quad (5)$$

Figure 5:
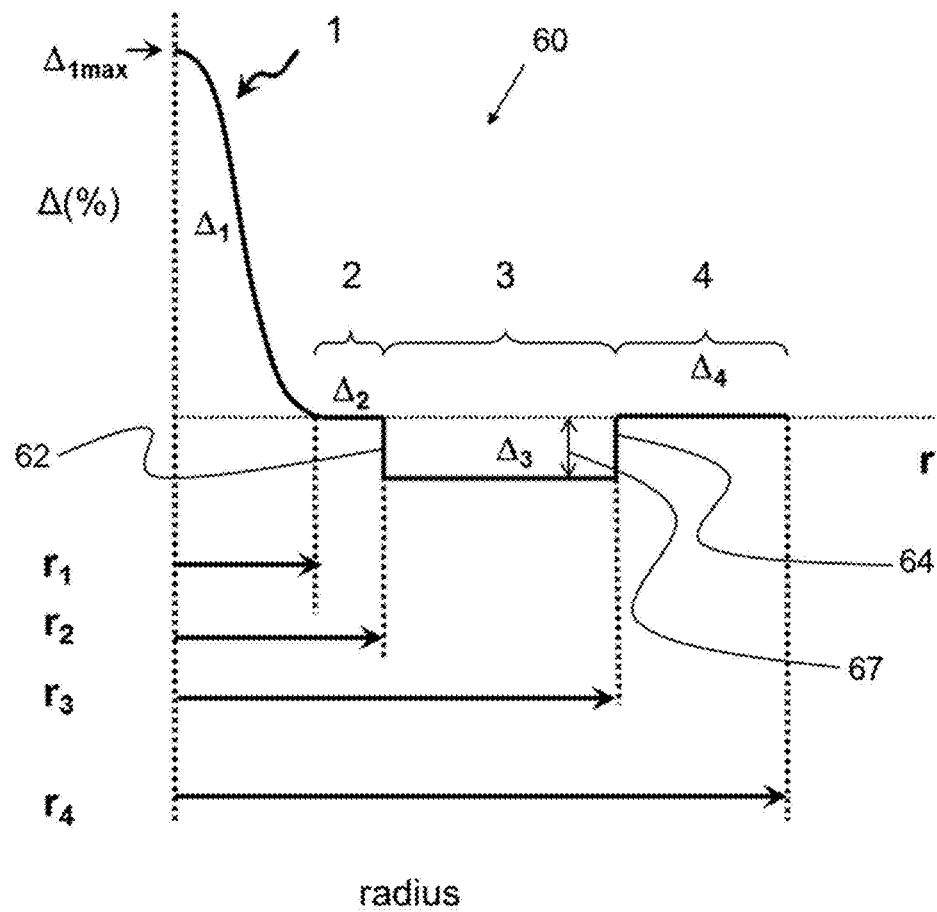
FIG. 5 depicts a relative refractive index profile of a multimode optical fiber.
Figure 7:
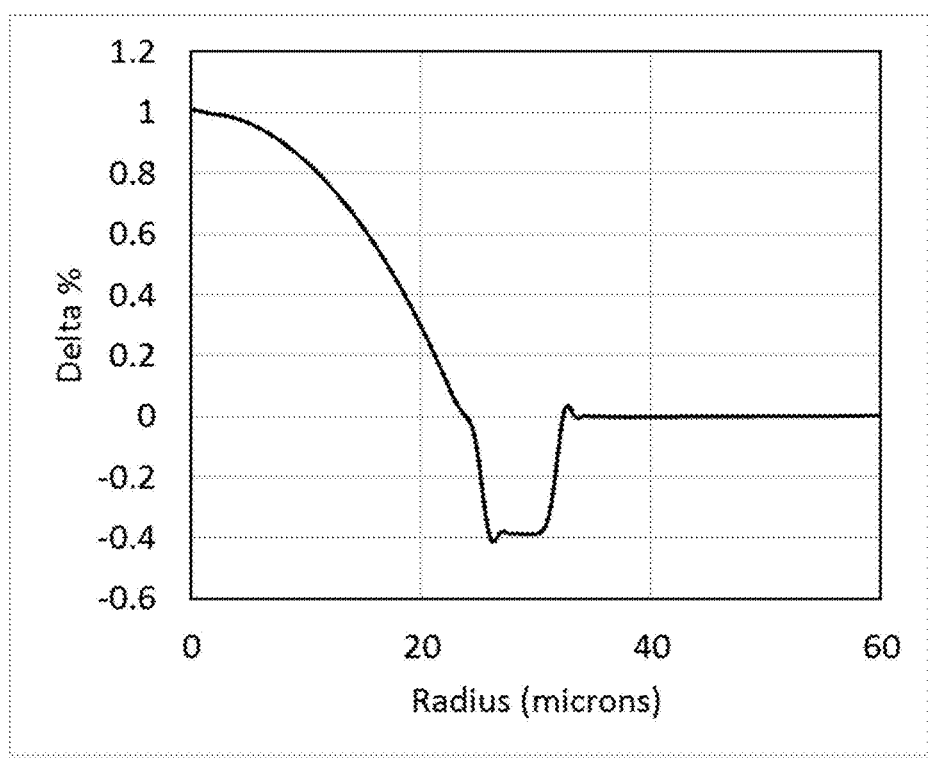
FIG. 7 shows a measured relative refractive index profile of a representative multimode optical fiber having an outer radius $r_6$ of 100 µm.
Figure 8:
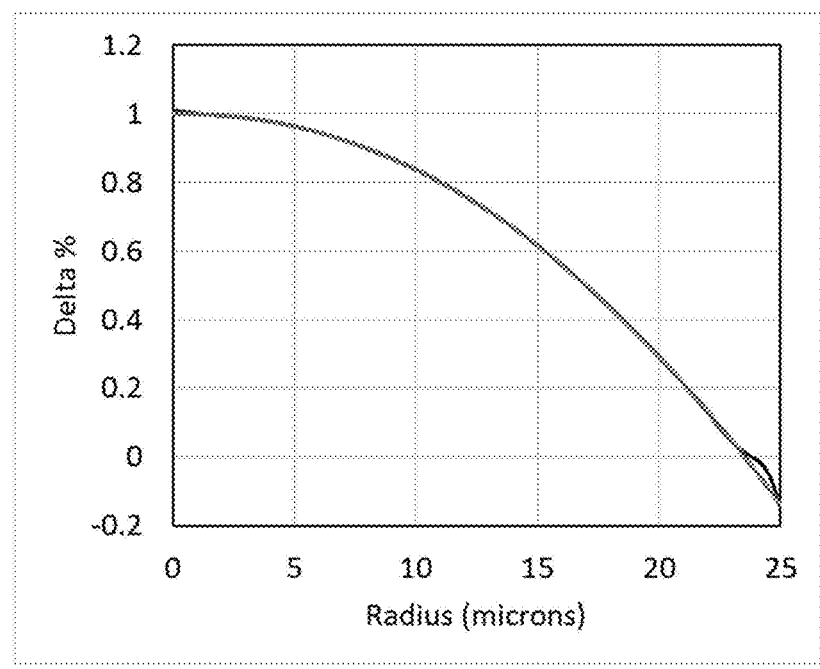
FIG. 8 shows the result of a fit of a core region using an α-profile and least squares minimization method over radial positions extending from 3 µm to 22 µm.
Figure 9:
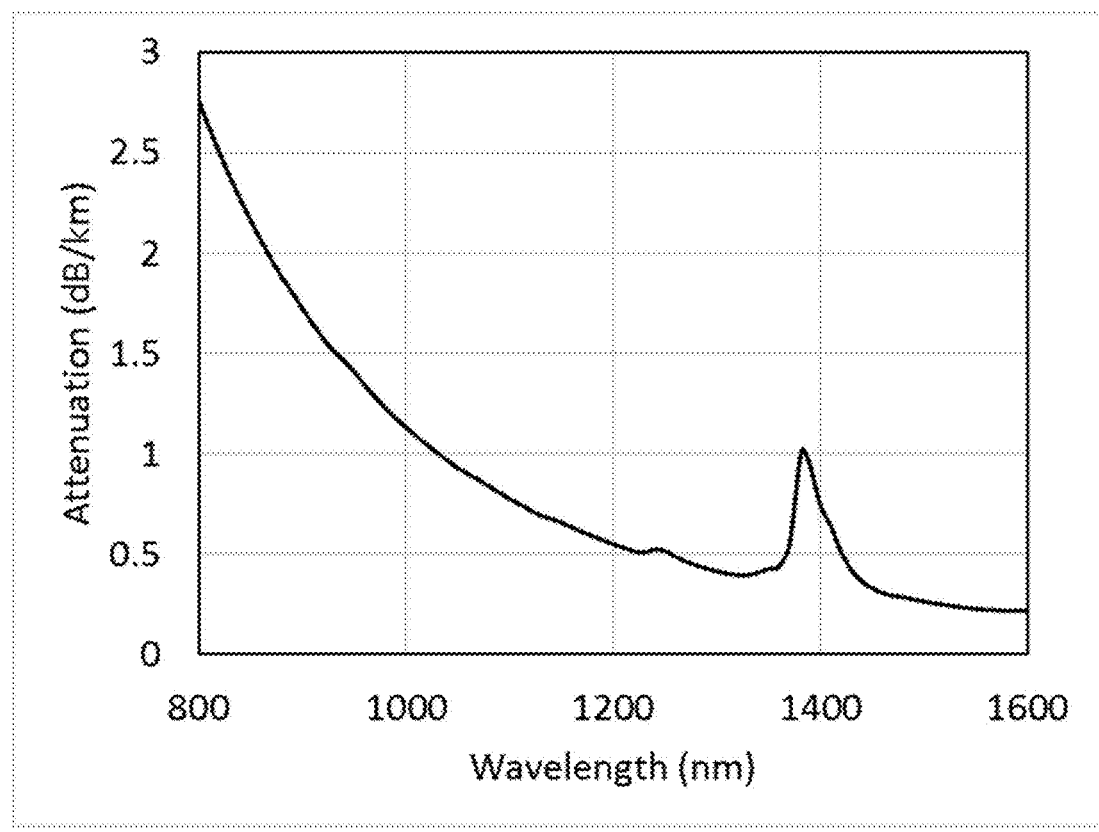
FIG. 9 shows attenuation of a representative multimode optical fiber with a radius $r_4$=62.5 µm and a radius $r_6$ of 100 µm.

When the core region has an index described by Eq. (5), the outer radius $r_1$ can be determined from the measured relative refractive index profile by the following procedure. Estimated values of the maximum relative refractive index $\Delta_{1max}$, α, and outer radius $r_{1est}$ are obtained from inspection of the measured relative refractive index profile and used to create a trial function $\Delta_{trial}$ between $r=-r_{1est}$ and $r=r_{1est}$. An idealized relative refractive index is shown in FIG. 5 and actual measured relative refractive index profiles of representative glass fibers having cores described by an α-profile are shown in FIGS. 7-9. The sum of the squares of the difference between the trial function and the measured profile ($\Delta_{meas}$), $\lambda^2 = \Sigma(\Delta_{trial} - \Delta_{meas})^2$, is minimized over values of r ranging between $0.1r_{1est}$ and $0.95r_{1est}$ using the Nelder-Mead algorithm (Nelder, John A. and R. Mead, "*A simplex* method for function minimization," Computer Journal 7: 308-313 (1965)) to determine $\Delta_{1max}$, α, and $r_1$.

"Trench volume" is defined as:

$$V_{Trench} = |2\int_{r_{Trench,inner}}^{r_{Trench,outer}} \Delta_{Trench}(r)rdr| \quad (6)$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of % Δ micron², % Δ-micron², % Δ-μm², or % Δμm², whereby these units can be used interchangeably herein. A trench region is also referred to herein as a depressed-index cladding region and trench volume is also referred to herein as $V_3$.

"Chromatic dispersion", herein referred to as "dispersion" unless otherwise noted, of an optical fiber is the sum of the material dispersion, the waveguide dispersion, and the inter-modal dispersion. In the case of single mode waveguide fibers, the inter-modal dispersion is zero. Dispersion values in a two-mode regime assume intermodal dispersion is zero. The zero-dispersion wavelength ($\lambda_0$) is the wavelength at which the dispersion has a value of zero. Dispersion slope is the rate of change of dispersion with respect to wavelength.

The optical fibers disclosed herein include a core region, a cladding region surrounding the core region, and a coating surrounding the cladding region. The core region and cladding region are glass. The cladding region includes multiple regions. The multiple cladding regions are preferably concentric regions. The cladding region includes an inner cladding region, a depressed-index cladding region, and an outer cladding region. The inner cladding region surrounds and is directly adjacent to the core region. The depressed-index cladding region surrounds and is directly adjacent to the inner cladding region. The outer cladding region surrounds and is directly adjacent to the outer cladding region. The depressed-index cladding region has a lower relative refractive index than the inner cladding and the outer cladding region. The depressed-index cladding region may also be referred to herein as a trench or trench region. The relative refractive index of the inner cladding region may be less than, equal to, or greater than the relative refractive index of the outer cladding region. The depressed-index cladding region may contribute to a reduction in bending losses and microbending sensitivity. The core region, inner cladding region, depressed-index cladding region, and outer cladding region are also referred to as core, cladding, inner cladding, depressed-index cladding, and outer cladding, respectively.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the depressed-index cladding region, radial position $r_4$ and relative refractive index $\Delta_4$ or $\Delta_4(r)$ refer to the outer cladding region, radial position $r_5$ refers to the primary coating, radial position $r_6$ refers to the secondary coating, and the radial position $r_7$ refers to the optional tertiary coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_{4min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the central core region is substantially cylindrical in shape and that the surrounding inner cladding region, depressed-index cladding region, outer cladding region, primary coating, and secondary coating are substantially annular in shape. Annular regions are characterized in terms of an inner radius and an outer radius. Radial positions $r_1$, $r_2$, $r_3$, $r_4$, $r_5$, $r_6$ and $r_7$ refer herein to the outermost radii of the core, inner cladding, depressed-index cladding, outer cladding, primary coating, secondary coating, and tertiary coating, respectively. The radius $r_6$ also corresponds to the outer radius of the optical fiber in embodiment without a tertiary coating. When a tertiary coating is present, the radius $r_7$ corresponds to the outer radius of the optical fiber.

When two regions are directly adjacent to each other, the outer radius of the inner of the two regions coincides with the inner radius of the outer of the two regions. The optical fiber, for example, includes a depressed-index cladding region surrounded by and directly adjacent to an outer cladding region. The radius $r_3$ corresponds to the outer radius of the depressed-index cladding region and the inner radius of the outer cladding region. The relative refractive index profile also includes a depressed-index cladding region surrounding and directly adjacent to an inner cladding region. The radial position $r_2$ corresponds to the outer radius of the inner cladding region and the inner radius of the depressed-index cladding region. Similarly, the radial position $r_1$ corresponds to the outer radius of the core region and the inner radius of the inner cladding region.

The following terminology applies to embodiments in which the relative refractive index profile includes an inner cladding region surrounding and directly adjacent to the core, a depressed-index cladding region surrounding and directly adjacent to the inner cladding region, an outer cladding region surrounding and directly adjacent to the depressed-index cladding region, a primary coating surrounding and directly adjacent to the outer cladding region, and a secondary coating surrounding and directly adjacent to the primary coating. The difference between radial position $r_2$ and radial position $r_1$ is referred to herein as the thickness of the inner cladding region. The difference between radial position $r_3$ and radial position $r_2$ is referred to herein as the thickness of the depressed-index cladding region. The difference between radial position $r_4$ and radial position $r_3$ is referred to herein as the thickness of the outer cladding region. The difference between radial position $r_5$ and radial position $r_4$ is referred to herein as the thickness of the primary coating. The difference between radial position $r_6$ and radial position $r_5$ is referred to herein as the thickness of the secondary coating.

As will be described further hereinbelow, the relative refractive indices of the core region, inner cladding region, depressed-index cladding region, and outer cladding region may differ. Each of the regions may be formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is silica glass. When the undoped glass is silica glass, updopants include Cl, Br, Ge, Al, P, Ti, Zr, Nb, and Ta, and downdopants include F and B. Regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different regions. Downdoping can also be accomplished by incorporating voids in silica glass. Voids correspond to localized regions filled with air or other gas (e.g. $N_2$, Ar, $SO_2$, $CO_2$, Kr, $O_2$) and/or evacuated spaces that extend for a length less than the full length of the glass fiber. The voids are preferably distributed randomly or non-periodically along the length of the glass fiber.

One embodiment relates to an optical fiber. The optical fiber includes a glass fiber surrounded by a coating. An example of an optical fiber is shown in schematic cross-sectional view in FIG. 1. Optical fiber 10 includes glass fiber 11 surrounded by primary coating 16 and secondary coating 18. Further description of glass fiber 11, primary coating 16, and secondary coating 18 is provided below.

Figure 2:
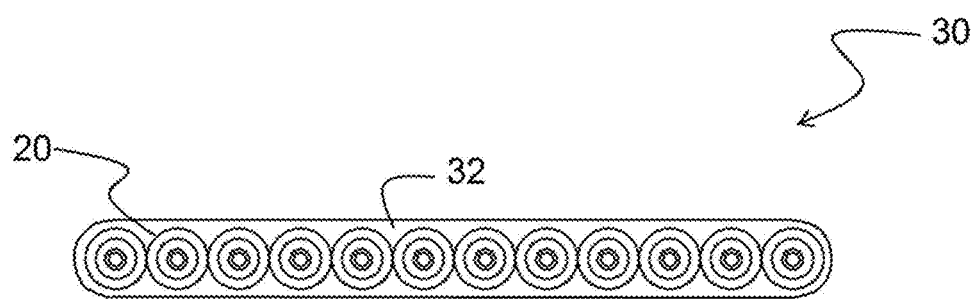
FIG. 2 is a schematic view of a representative optical fiber ribbon.

FIG. 2 illustrates an optical fiber ribbon 30. The ribbon 30 includes a plurality of optical fibers 20 and a matrix 32 encapsulating the plurality of optical fibers. Optical fibers 20 include a core region, a cladding region, a primary coating, and a secondary coating as described above. Optical fibers 20 may also include a tertiary coating as noted above. The secondary coating may include a pigment. The optical fibers 20 are aligned relative to one another in a substantially planar and parallel relationship. The optical fibers in fiber optic ribbons are encapsulated by the ribbon matrix 32 in any of several known configurations (e.g., edge-bonded ribbon, thin-encapsulated ribbon, thick-encapsulated ribbon, or multi-layer ribbon) by conventional methods of making fiber optic ribbons. In FIG. 2, the fiber optic ribbon 30 contains twelve (12) optical fibers 20; however, it should be apparent to those skilled in the art that any number of optical fibers 20 (e.g., two or more) may be employed to form fiber optic ribbon 30 disposed for a particular use. The ribbon matrix 32 has tensile properties similar to the tensile properties of a secondary coating and can be formed from the same, similar or different composition used to prepare a secondary coating.

Figure 3:
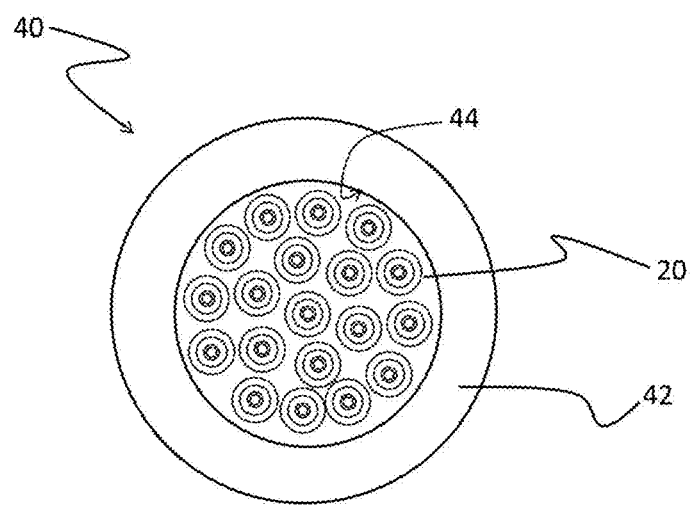
FIG. 3 is a schematic view of a representative optical fiber cable.

FIG. 3 illustrates an optical fiber cable 40. Cable 40 includes a plurality of optical fibers 20 surrounded by jacket 42. Optical fibers 20 may be densely or loosely packed into a conduit enclosed by inner surface 44 of jacket 42. The number of fibers placed in jacket 42 is referred to as the "fiber count" of optical fiber cable 40. The jacket 42 is formed from an extruded polymer material and may include multiple concentric layers of polymers or other materials. Optical fiber cable 40 may include one or more strengthening members (not shown) embedded within jacket 42 or placed within the conduit defined by inner surface 44. Strengthening members include fibers or rods that are more rigid than jacket 42. The strengthening member is made from metal, braided steel, glass-reinforced plastic, fiber glass, or other suitable material. Optical fiber cable 40 may include other layers surrounded by jacket 42 (e.g. armor layers, moisture barrier layers, rip cords, etc.). Optical fiber cable 40 may have a stranded, loose tube core or other fiber optic cable construction.

Glass Fiber.

The glass fiber 11 includes a core region 12 and a cladding region 14, as is familiar to the skilled artisan. Core region 12 has a higher refractive index than cladding region 14 and glass fiber 11 functions as a waveguide.

A preferred glass fiber is a graded-index glass fiber, which has a core region whose refractive index varies with distance from the glass fiber center. One example of a graded-index glass fiber is a glass fiber with a core region having a relative refractive index profile with an α-profile defined by Eq. (4) above. In a preferred embodiment, a graded-index glass fiber has a relative refractive index in the core region that continuously varies between the centerline of the glass fiber and the outer radius $r_1$ of the core region. It is also preferable for the relative refractive index of a graded-index glass fiber to be higher near the centerline of the glass fiber than near the outer radius $r_1$ of the core region.

The optical fibers described herein include a core surrounded by an inner cladding region, a depressed-index cladding region surrounding the inner cladding regions, an outer cladding region surrounding the depressed-index cladding region, a primary coating surrounding the outer cladding region, and a secondary coating surrounding the primary coating. The inner cladding region is directly adjacent to the core, the depressed-index cladding region is directly adjacent to the inner cladding region, the outer cladding region is directly adjacent to the depressed-index cladding region, the primary coating is directly adjacent to the outer cladding region, and the secondary coating is directly adjacent to the primary coating.

Figure 4:
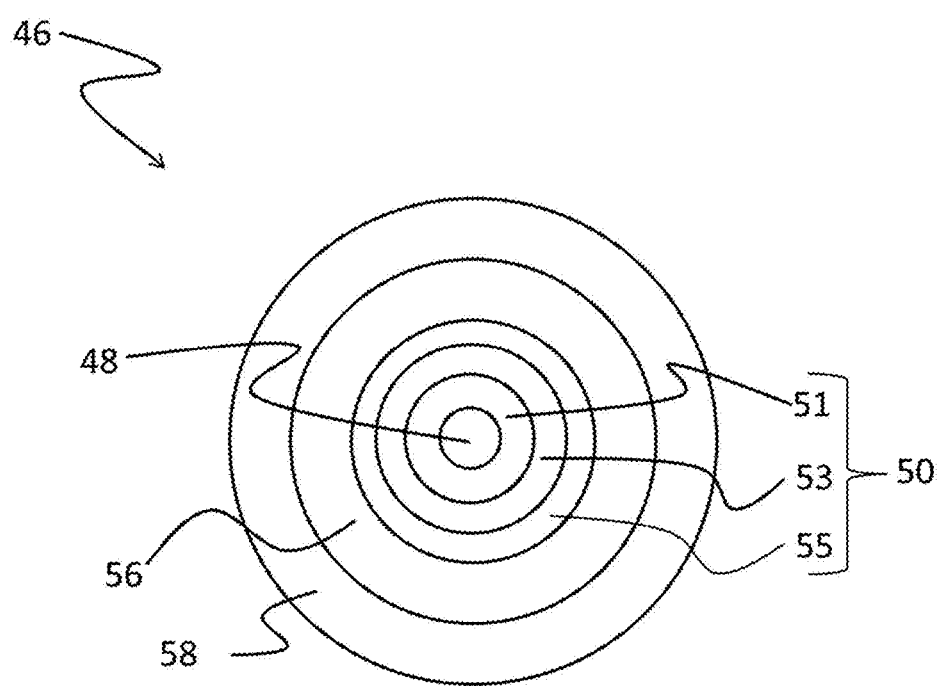
FIG. 4 depicts a cross-section of a multimode optical fiber.

A schematic cross-sectional depiction of the optical fibers is shown in FIG. 4. In FIG. 4, optical fiber 46 includes core region 48, cladding region 50, primary coating 56, and secondary coating 58. Cladding region 50 includes inner cladding region 51, depressed-index cladding region 53, and outer cladding region 55. A tertiary layer (e.g. ink layer) optionally surrounds or is directly adjacent to the secondary coating.

A representative relative refractive index profile for a glass fiber is presented in FIG. 5. FIG. 5 shows a rectangular trench profile for a glass fiber 60 having a core region (1) with outer radius $r_1$ and relative refractive index $\Delta_1$ with maximum relative refractive index $\Delta_{1max}$, an inner cladding region (2) extending from radial position $r_1$ to radial position $r_2$ and having relative refractive index $\Delta_2$, a depressed-index cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$. In the profile of FIG. 5, the depressed-index cladding region (3) may be referred to herein as a trench and has a constant or average relative refractive index that is less than the relative refractive indices of the inner cladding region (2) and the outer cladding region (4). Core region (1) has the highest average and maximum relative refractive index in the profile. Core region (1) may include a lower index region at or near the centerline (known in the art as a "centerline dip") (not shown).

In the relative refractive index profile of FIG. 5, the core region (1) of the glass fiber has a graded index relative refractive index profile described by an α-profile. The radial position $r_0$ (corresponding to $\Delta_{1max}$) of the α-profile corresponds to the centerline (r=0) of the fiber and the radial position $r_z$ of the α-profile corresponds to the core radius $r_1$. In embodiments with a centerline dip, the radial position $r_0$ is slightly offset from the centerline of the fiber. In another embodiment, core region (1) has a graded relative refractive index profile not defined by an α-profile. In some embodiments, the relative refractive index $\Delta_1$ continuously decreases in the radial direction away from the centerline. In other embodiments, relative refractive index $\Delta_1$ varies over some radial positions between the centerline and $r_1$, and also includes a constant or approximately constant value over other radial positions between the centerline and $r_1$.

In FIG. 5, transition region 62 from inner cladding region (2) to depressed-index cladding region (3) and transition region 64 from depressed-index cladding region (3) to outer cladding region (4) are shown as step changes. It is to be understood that a step change is an idealization and that transition region 62 and/or transition region 64 may not be strictly vertical in practice as depicted in FIG. 5. Instead, transition region 62 and/or transition region 64 may have a slope or curvature. When transition region 62 and/or transition region 64 are non-vertical, the inner radius $r_2$ and outer radius $r_3$ of depressed-index cladding region (3) correspond to the mid-points of transition regions 62 and 64, respectively. The mid-points correspond to half of the depth 67 of the depressed-index cladding region (3).

The relative ordering of relative refractive indices $\Delta_1$, $\Delta_2$, $\Delta_3$, and $\Delta_4$ in the relative refractive index profile shown in FIG. 5 satisfy the conditions $\Delta_{1max} > \Delta_4 > \Delta_3$ and $\Delta_{1max} > \Delta_2 > \Delta_3$. The values of $\Delta_2$ and $\Delta_4$ may be equal or either may be greater than the other, but both $\Delta_2$ and $\Delta_4$ are between $\Delta_{1max}$ and $\Delta_3$.

The core region comprises silica glass. The silica glass of the core region is undoped silica glass, updoped silica glass, and/or downdoped silica glass. Updoped silica glass includes silica glass doped with $GeO_2$, $Al_2O_3$, $P_2O_5$, or a halogen (e.g. Cl, Br). Downdoped silica glass includes silica glass doped with F. In some embodiments, the core region is co-doped with F and one or more of $GeO_2$, $Al_2O_3$, and $P_2O_5$. The concentration of Cl or Br in the core is in the range from 0.5 wt % to 6.0 wt %, or in the range from 1.0 wt % to 5.5 wt %, or in the range from 1.5 wt % to 5.0 wt %, or in the range from 2.0 wt % to 4.5 wt %, or in the range from 2.5 wt % to 4.0 wt %.

In some embodiments, the core region includes an updopant and a downdopant, where the concentration of updopant is highest at the centerline (r=0) and lowest at the core radius $r_1$ and the concentration of downdopant is lowest at the centerline (r=0) and highest at the core radius $r_1$. In such embodiments, the relative refractive index $\Delta_1$ can have a positive value near the centerline (r=0) and decrease to a negative value at the core radius $r_1$. $GeO_2$ is the preferred updopant and F is the preferred downdopant for multiply doped core regions.

In some embodiments, the relative refractive index of the core of the glass fiber is described by an α-profile with an α value in the range from 1.70 to 2.50, or in the range from 1.80 to 2.40, or in the range from 1.90 to 2.30, or in the range from 1.90 to 2.20, or in the range from 1.90 to 2.10, or in the range from 1.95 to 2.25, or in the range from 2.00 to 2.20, or in the range from 1.95 to 2.05, or in the range from 2.05 to 2.15.

The radius $r_1$ is defined as the radial position at which the relative refractive index $\Delta_1$ decreases from $\Delta_{1max}$ to 0.0% in the direction of increasing radial position from the centerline (r=0). The radius $r_1$ of the core region is in the range from 15.0 μm to 35.0 μm, or in the range from 17.5 μm to 32.5 μm, or in the range from 17.5 μm to 27.5 μm, or in the range from 17.5 μm to 22.5 μm, or in the range from 20.0 μm to 30.0 μm, or in the range from 22.5 μm to 27.5 μm, or in the range from 23.0 μm to 27.0 μm, or in the range from 23.5 μm to 26.5 μm.

The maximum relative refractive index $\Delta_{1max}$ of the core region is in the range from 0.50% to 1.40%, or in the range from 0.60% to 1.30%, or in the range from 0.70% to 1.20%, or in the range from 0.80% to 1.10%. The relative refractive index $\Delta_1$ of the core region is in the range from −0.20% to 1.40%, or in the range from −0.10% to 1.30%, or in the range from −0.05% to 1.20%.

The inner cladding region is comprised of undoped silica glass, updoped silica glass, or downdoped silica glass. Updoped silica glass includes silica glass doped with $GeO_2$, $Al_2O_3$, $P_2O_5$, or a halogen (e.g. Cl, Br). Downdoped silica glass includes silica glass doped with F and silica glass with voids. If doped with an updopant, the average concentration of updopant in the inner cladding region is less than the average concentration of updopant in the core region. If doped with a downdopant, the average concentration of downdopant in the inner cladding region is greater than the average concentration of downdopant in the core region.

The relative refractive index $\Delta_2$ or $\Delta_{2max}$ of the inner cladding region is in the range from −0.20% to 0.20%, or in the range from −0.15% to 0.15%, or in the range from −0.10% to 0.10%, or in the range from −0.05% to 0.05%.

The relative refractive index $\Delta_2$ is preferably constant or approximately constant. The difference $\Delta_{1max}-\Delta_2$ (or the difference $\Delta_{1max}-\Delta_{2max}$) is greater than 0.80%, or greater than 0.90%, or greater than 1.00%, or in the range from 0.80% to 1.20%, or in the range from 0.90% to 1.10%.

The radius $r_2$ of the inner cladding region is in the range from 15.5 μm to 38.0 μm, or in the range from 18.0 μm to 35.5 μm, or in the range from 18.0 μm to 30.5 μm, or in the range from 18.0 μm to 25.5 μm, or in the range from 20.5 μm to 33.0 μm, or in the range from 23.0 μm to 30.5 μm, or in the range from 23.5 μm to 30.0 μm, or in the range from 24.0 μm to 29.5 μm. The thickness $r_2-r_1$ of the inner cladding region is in the range from 0.3 μm to 3.0 μm, or in the range from 0.5 μm to 2.5 μm, or in the range from 0.5 μm to 2.0 μm.

The depressed-index cladding region comprises down-doped silica glass. The preferred downdopant is F. The concentration of F is in the range from 0.30 wt % to 2.50 wt %, or in the range from 0.60 wt % to 2.25 wt %, or in the range from 0.90 wt % to 2.00 wt %.

The relative refractive index $\Delta_3$ or $\Delta_{3min}$ is in the range from −0.10% to −0.80%, or in the range from −0.20% to −0.70%, or in the range from −0.30% to −0.60%. The relative refractive index $\Delta_3$ is preferably constant or approximately constant. The difference $\Delta_{1max}-\Delta_3$ (or the difference $\Delta_{1max}-\Delta_{3min}$, or the difference $\Delta_1-\Delta_3$, or the difference $\Delta_1-\Delta_{3min}$) is greater than 0.90%, or greater than 1.10%, or greater than 1.30%, or in the range from 0.90% to 1.80%, or in the range from 1.00% to 1.60%. The difference $\Delta_2-\Delta_3$ (or the difference $\Delta_2-\Delta_{3min}$, or the difference $\Delta_{2max}-\Delta_3$, or the difference $\Delta_{2max}-\Delta_{3min}$) is greater than 0.10%, or greater than 0.30%, or greater than 0.50%, or in the range from 0.10% to 0.80%, or in the range from 0.30% to 0.60%.

The inner radius of the depressed-index cladding region is $r_2$ and has the values specified above. The outer radius $r_3$ of the depressed-index cladding region is in the range from 16.0 μm to 48.0 μm, or in the range from 18.5 μm to 45.5 μm, or in the range from 18.5 μm to 40.5 μm, or in the range from 21.0 μm to 43.0 μm, or in the range from 23.5 μm to 40.5 μm, or in the range from 23.5 μm to 35.5 μm, or in the range from 24.0 μm to 40.0 μm, or in the range from 24.5 μm to 39.5 μm. The thickness $r_3-r_2$ of the depressed-index cladding region is in the range from 0.5 μm to 10.0 μm, or in the range from 1.0 μm to 8.0 μm, or in the range from or in the range from 1.5 μm to 7.0 μm, or in the range from 2.0 μm to 6.0 μm.

The relative refractive index $\Delta_4$ or $\Delta_{4max}$ of the outer cladding region is in the range from −0.20% to 0.20%, or in the range from −0.15% to 0.15%, or in the range from −0.10% to 0.10%, or in the range from −0.05% to 0.05%. The relative refractive index $\Delta_4$ is preferably constant or approximately constant. The difference $\Delta_4-\Delta_3$ (or the difference $\Delta_4-\Delta_{3min}$, or the difference $\Delta_{4max}-\Delta_3$, or the difference $\Delta_{4max}-\Delta_{3min}$) is greater than 0.10%, or greater than 0.30%, or greater than 0.50%, or in the range from 0.10% to 0.80%, or in the range from 0.30% to 0.60%.

The inner radius of the outer cladding region is $r_3$ and has the values specified above. The outer radius $r_4$ corresponds or closely corresponds to the diameter of standard glass fibers and a reduced overall optical fiber diameter is achieved through a reduction in the thickness of the primary coating and/or secondary coating using coating compositions described below. In this embodiment, the outer radius $r_4$ is greater than or equal to 60.0 μm, or greater than or equal to 62.5 μm, or greater than or equal to 65.0 μm, in the range from 60.0 μm to 65.0 μm, or about 62.5 μm.

Multimode optical fibers with the glass fibers and coatings described herein have a numerical aperture at 850 nm greater than 0.160, or greater than 0.180, or greater than 0.200, or greater than 0.220, or greater than 0.240, or greater than 0.260, or in the range from 0.160 to 0.240, or in the range from 0.170 to 0.230, or in the range from 0.180 to 0.220, or in the range from 0.185 to 0.215. Numerical aperture was measured at a wavelength of 850 nm using the method set forth in TIA SP3-2839-URV2 FOTP-177 IEC-60793-1-43, titled "Measurement Methods and Test Procedures—Numerical Aperture".

Some embodiments of multimode optical fibers with the glass fibers and coatings disclosed herein have attenuation, as measured by OTDR, at 850 nm less than 10.0 dB/km, or less than 8.0 dB/km, less than 6.0 dB/km, less than 5.0 dB/km, or less than 4.0 dB/km or even less than 3.5 dB/km. Other embodiments of multimode optical fibers with the glass fibers disclosed herein have attenuation, as measured by OTDR, at 850 nm less than 3.0 dB/km, less than 2.5 dB/km, less than 2.4 dB/km, or less than 2.3 dB/km. Still other embodiments of multimode optical fibers with the glass fibers disclosed herein have attenuation, as measured by OTDR, at 1300 nm less than 8.0 dB/km, or less than 6.0 dB/km, less than 4.0 dB/km, less than 2.0 dB/km, or less than 1.5 dB/km. Further embodiments of multimode optical fibers with the glass fibers disclosed herein have attenuation, as measured by OTDR, at 1300 nm less than 1.0 dB/km, less than 0.8 dB/km, less than 0.7 dB/km, or less than 0.6 dB/km. Additional embodiments of multimode optical fibers with the glass fibers disclosed herein have attenuation, as measured by OTDR, over the wavelength range from 820 to 1600 nm less than 8.0 dB/km, or less than 6.0 dB/km, less than 5.0 dB/km, less than 4.0 dB/km, or less than 3.0 dB/km, or less than 2.5 dB/km.

The multimode optical fibers have a minEMB at 850 nm greater than 2000 MHz-km, or greater than 4000 MHz-km, or greater than 4700 MHz-km, or greater than 6000 MHz-km, or greater than 8000 MHz-km, or greater than 10000 MHz-km, or in the range from 2000 MHz-km to 13000 MHz-km, or in the range from 3000 MHz-km to 10000 MHz-km, or in the range from 4000 MHz-km-8000 MHz-km, or in the range from 4700 MHz-km-8000 MHz-km.

The multimode optical fibers have a minEMB at 980 nm greater than 2000 MHz-km, or greater than 4000 MHz-km, or greater than 4700 MHz-km, or greater than 6000 MHz-km, or greater than 8000 MHz-km, or greater than 10000 MHz-km, or in the range from 2000 MHz-km to 13000 MHz-km, or in the range from 3000 MHz-km to 10000 MHz-km, or in the range from 4000 MHz-km-8000 MHz-km, or in the range from 4700 MHz-km-8000 MHz-km.

The multimode optical fibers have a minEMB at 1060 nm greater than 2000 MHz-km, or greater than 4000 MHz-km, or greater than 4700 MHz-km, or greater than 6000 MHz-km, or greater than 8000 MHz-km, or greater than 10000 MHz-km, or in the range from 2000 MHz-km to 13000 MHz-km, or in the range from 3000 MHz-km to 10000 MHz-km, or in the range from 4000 MHz-km-8000 MHz-km, or in the range from 4700 MHz-km-8000 MHz-km.

Coatings.

The transmissivity of light through an optical fiber is highly dependent on the properties of the coatings applied to the glass fiber. The coatings typically include a primary coating and a secondary coating, where the secondary coating surrounds the primary coating and the primary coating contacts the glass fiber (which includes a central core region surrounded by a cladding region). In a typical configuration, the primary coating directly contacts the glass fiber and the secondary coating directly contacts the primary coating. The secondary coating is a harder material (higher Young's modulus) than the primary coating and is designed to protect the glass fiber from damage caused by abrasion or external forces that arise during processing, handling, and installation of the optical fiber. The primary coating is a softer material (lower Young's modulus) than the secondary coating and is designed to buffer or dissipates stresses that result from forces applied to the outer surface of the secondary coating. Dissipation of stresses within the primary coating attenuates the stress and minimizes the stress that reaches the glass fiber. The primary coating is especially important in dissipating stresses that arise due to the microbends the optical fiber encounters when deployed in a cable. The microbending stresses transmitted to the glass fiber need to be minimized because microbending stresses create local perturbations in the refractive index profile of the glass fiber. The local refractive index perturbations lead to intensity losses for the light transmitted through the glass fiber. By dissipating stresses, the primary coating minimizes intensity losses caused by microbending.

The multimode optical fibers include the glass fibers disclosed herein along with a primary coating and a secondary coating. The primary coating surrounds and directly contacts the glass fiber and the secondary coating surrounds and directly contacts the primary coating. An optional tertiary layer (e.g. ink layer) surrounds and directly contacts the secondary coating.

The primary coating preferably has a higher refractive index than the cladding region of the glass fiber in order to allow it to strip errant optical signals away from the core region. The primary coating should maintain adequate adhesion to the glass fiber during thermal and hydrolytic aging, yet be strippable from the glass fiber for splicing purposes.

Primary and secondary coatings are typically formed by applying a curable coating composition to the glass fiber as a viscous liquid and curing. The optical fiber may also include a tertiary coating that surrounds the secondary coating. The tertiary coating may include pigments, inks or other coloring agents to mark the optical fiber for identification purposes and typically has a Young's modulus similar to the Young's modulus of the secondary coating.

The following terminology is used in reference to the coatings and coating compositions described herein.

The coatings described herein are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition or as a coating. The cured product is preferably a polymer. The curing process is induced by energy. Forms of energy include radiation or thermal energy. In a preferred embodiment, curing occurs with radiation, where radiation refers to electromagnetic radiation. Curing induced by radiation is referred to herein as radiation curing or photocuring. A radiation-curable component is a component that can be induced to undergo a photochemical curing reaction when exposed to radiation of a suitable wavelength at a suitable intensity for a sufficient period of time. Suitable wavelengths include wavelengths in the infrared, visible, or ultraviolet portion of the electromagnetic spectrum. The radiation curing reaction preferably occurs in the presence of a photoinitiator. A radiation-curable component may also be thermally curable. Similarly, a thermally curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component. Multifunctional curable components include two or more functional groups capable of forming covalent bonds during the curing process and can introduce crosslinks into the polymeric network that forms during the curing process. Multifunctional curable components may also be referred to herein as "crosslinkers" or "curable crosslinkers". Curable components include curable monomers and curable oligomers. Examples of functional groups that participate in covalent bond formation during the curing process are identified hereinafter.

The term "(meth)acrylate" means methacrylate, acrylate, or a combination of methacrylate and acrylate.

Values of Young's modulus, % elongation, and tear strength refer to values as determined under the measurement conditions by the procedures described herein.

Primary Coating—Compositions.

The primary coating is a cured product of a curable primary coating composition. The curable primary coating compositions provide a primary coating for optical fibers that exhibits low Young's modulus, low pullout force, and strong cohesion. The curable primary coating compositions further enable formation of a primary coating that features clean strippability and high resistance to defect formation during the stripping operation. Low pullout force facilitates clean stripping of the primary coating with minimal residue and strong cohesion inhibits initiation and propagation of defects in the primary coating when it is subjected to stripping forces. The primary coatings exhibit these advantages even at reduced thickness.

The primary coating is a cured product of a radiation-curable primary coating composition that includes an oligomer, a monomer, a photoinitiator and, optionally, an additive. The following disclosure describes oligomers for the radiation-curable primary coating compositions, radiation-curable primary coating compositions containing at least one of the oligomers, cured products of the radiation-curable primary coating compositions that include at least one of the oligomers, glass fibers coated with a radiation-curable primary coating composition containing at least one of the oligomers, and glass fibers coated with the cured product of a radiation-curable primary coating composition containing at least one of the oligomers.

The oligomer preferably includes a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups.

A preferred diisocyanate compound is represented by formula (I):

which includes two terminal isocyanate groups separated by a linkage group $R_1$. In one embodiment, the linkage group $R_1$ includes an alkylene group. The alkylene group of linkage group $R_1$ is linear (e.g. methylene or ethylene), branched (e.g. isopropylene), or cyclic (e.g. cyclohexylene, phenylene). The cyclic group is aromatic or non-aromatic. In some embodiments, the linkage group $R_1$ is 4,4'-methylene bis(cyclohexyl) group and the diisocyanate compound is 4,4'-methylene bis(cyclohexyl isocyanate). In some embodiments, the linkage group $R_1$ lacks an aromatic group, or lacks a phenylene group, or lacks an oxyphenylene group.

The polyol is represented by molecular formula (II):

where $R_2$ includes an alkylene group, —O—$R_2$— is a repeating alkoxylene group, and x is an integer. Preferably, x is greater than 20, or greater than 40, or greater than 50, or greater than 75, or greater than 100, or greater than 125, or greater than 150, or in the range from 20 to 500, or in the range from 20 to 300, or in the range from 30 to 250, or in the range from 40 to 200, or in the range from 60 to 180, or in the range from 70 to 160, or in the range from 80 to 140. $R_2$ is preferably a linear or branched alkylene group, such as methylene, ethylene, propylene (normal, iso or a combination thereof), or butylene (normal, iso, secondary, tertiary, or a combination thereof). The polyol may be a polyalkylene oxide, such as polyethylene oxide, or a polyalkylene glycol, such as polypropylene glycol. Polypropylene glycol is a preferred polyol. The molecular weight of the polyol is greater than 1000 g/mol, or greater than 2500 g/mol, or greater than 5000 g/mol, or greater than 7500 g/mol, or greater than 10000 g/mol, or in the range from 1000 g/mol to 20000 g/mol, or in the range from 2000 g/mol to 15000 g/mol, or in the range from 2500 g/mol to 12500 g/mol, or in the range from 2500 g/mol to 10000 g/mol, or in the range from 3000 g/mol to 7500 g/mol, or in the range from 3000 g/mol to 6000 g/mol, or in the range from 3500 g/mol to 5500 g/mol. In some embodiments, the polyol is polydisperse and includes molecules spanning a range of molecular weights such that the totality of molecules combines to provide the number average molecular weight specified hereinabove.

The unsaturation of the polyol is less than 0.25 meq/g, or less than 0.15 meq/g, or less than 0.10 meq/g, or less than 0.08 meq/g, or less than 0.06 meq/g, or less than 0.04 meq/g, or less than 0.02 meq/g, or less than 0.01 meq/g, or less than 0.005 meq/g, or in the range from 0.001 meq/g to 0.15 meq/g, or in the range from 0.005 meq/g to 0.10 meq/g, or in the range from 0.01 meq/g to 0.10 meq/g, or in the range from 0.01 meq/g to 0.05 meq/g, or in the range from 0.02 meq/g to 0.10 meq/g, or in the range from 0.02 meq/g to 0.05 meq/g. As used herein, unsaturation refers to the value determined by the standard method reported in ASTM D4671-16. In the method, the polyol is reacted with mercuric acetate and methanol in a methanolic solution to produce acetoxymercuricmethoxy compounds and acetic acid. The reaction of the polyol with mercuric acetate is equimolar and the amount of acetic acid released is determined by titration with alcoholic potassium hydroxide to provide the measure of unsaturation used herein. To prevent interference of excess mercuric acetate on the titration of acetic acid, sodium bromide is added to convert mercuric acetate to the bromide.

The reaction to form the oligomer further includes addition of a hydroxy acrylate compound to react with terminal isocyanate groups present in unreacted starting materials (e.g. the diisocyanate compound) or products formed in the reaction of the diisocyanate compound with the polyol (e.g. urethane compounds with terminal isocyanate groups). The hydroxy acrylate compound reacts with terminal isocyanate groups to provide terminal acrylate groups for one or more constituents of the oligomer. In some embodiments, the hydroxy acrylate compound is present in excess of the amount needed to fully convert terminal isocyanate groups to terminal acrylate groups. The oligomer includes a single polyether urethane acrylate compound or a combination of two or more polyether urethane acrylate compounds.

The hydroxy acrylate compound is represented by molecular formula (III):

where $R_3$ includes an alkylene group. The alkylene group of $R_3$ is linear (e.g. methylene or ethylene), branched (e.g. isopropylene), or cyclic (e.g. phenylene). In some embodiments, the hydroxy acrylate compound includes substitution of the ethylenically unsaturated group of the acrylate group. Substituents of the ethylenically unsaturated group include alkyl groups. An example of a hydroxy acrylate compound with a substituted ethylenically unsaturated group is a hydroxy methacrylate compound. The discussion that follows describes hydroxy acrylate compounds. It should be understood, however, that the discussion applies to substituted hydroxy acrylate compounds and in particular to hydroxy methacrylate compounds.

In different embodiments, the hydroxy acrylate compound is a hydroxyalkyl acrylate, such as 2-hydroxyethyl acrylate. The hydroxy acrylate compound may include water at residual or higher levels. The presence of water in the hydroxy acrylate compound may facilitate reaction of isocyanate groups to reduce the concentration of unreacted isocyanate groups in the final reaction composition. In various embodiments, the water content of the hydroxy acrylate compound is at least 300 ppm, or at least 600 ppm, or at least 1000 ppm, or at least 1500 ppm, or at least 2000 ppm, or at least 2500 ppm.

In the foregoing exemplary molecular formulas (I), II), and (III), the groups $R_1$, $R_2$, and $R_3$ independently are all the same, are all different, or include two groups that are the same and one group that is different.

The diisocyanate compound, hydroxy acrylate compound and polyol are combined simultaneously and reacted, or are combined sequentially (in any order) and reacted. In one embodiment, the oligomer is formed by reacting a diisocyanate compound with a hydroxy acrylate compound and reacting the resulting product composition with a polyol. In another embodiment, the oligomer is formed by reacting a diisocyanate compound with a polyol compound and reacting the resulting product composition with a hydroxy acrylate compound.

The oligomer is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers. In embodiments, when p is 2.0, n is in the range from 3.0 to 5.0, or in the range from 3.2 to 4.8, or in the range from 3.4 to 4.6, or in the range from 3.5 to 4.4, or in the range from 3.6 to 4.2, or in the range from 3.7 to 4.0; and m is in the range from 1.5 to 4.0, or in the range from 1.6 to 3.6, or in the range from 1.7 to 3.2, or in the range from 1.8 to 2.8, or in the range from 1.9 to 2.4. For values of p other than 2.0, the molar ratio n:m:p scales proportionally. For example, the molar ratio n:m:p=4.0:3.0:2.0 is equivalent to the molar ratio n:m:p=2.0:1.5:1.0.

The mole number m may be selected to provide an amount of the hydroxy acrylate compound to stoichiometrically react with unreacted isocyanate groups present in the product composition formed from the reaction of diisocyanate compound and polyol used to form the oligomer. The isocyanate groups may be present in unreacted diisocyanate compound (unreacted starting material) or in isocyanate-terminated urethane compounds formed in reactions of the diisocyanate compound with the polyol. Alternatively, the mole number m may be selected to provide an amount of the hydroxy acrylate compound in excess of the amount needed to stoichiometrically react with any unreacted isocyanate groups present in the product composition formed from reaction of the diisocyanate compound and the polyol. The hydroxy acrylate compound is added as a single aliquot or multiple aliquots. In one embodiment, an initial aliquot of hydroxy acrylate is included in the reaction mixture used to form the oligomer and the product composition formed can be tested for the presence of unreacted isocyanate groups (e.g. using FTIR spectroscopy to detect the presence of isocyanate groups). Additional aliquots of hydroxy acrylate compound may be added to the product composition to stoichiometrically react with unreacted isocyanate groups (using, for example, FTIR spectroscopy to monitor a decrease in a characteristic isocyanate frequency (e.g. at 2260 $cm^{-1}$ to 2270 $cm^{-1}$) as isocyanate groups are converted by the hydroxy acrylate compound). In alternate embodiments, aliquots of hydroxy acrylate compound in excess of the amount needed to stoichiometrically react with unreacted isocyanate groups are added. As described more fully below, for a given value of p, the ratio of the mole number m to the mole number n influences the relative proportions of polyether urethane diacrylate compound and di-adduct compound in the oligomer and differences in the relative proportions of polyether urethane diacrylate compound and di-adduct compound lead to differences in the tear strength and/or critical stress of coatings formed from the oligomer.

In one embodiment, the oligomer is formed from a reaction mixture that includes 4,4'-methylene bis(cyclohexyl isocyanate), 2-hydroxyethyl acrylate, and polypropylene glycol in the molar ratios n:m:p as specified above, where the polypropylene glycol has a number average molecular weight in the range from 2500 g/mol to 6500 g/mol, or in the range from 3000 g/mol to 6000 g/mol, or in the range from 3500 g/mol to 5500 g/mol.

The oligomer includes two components. The first component is a polyether urethane diacrylate compound having the molecular formula (IV):

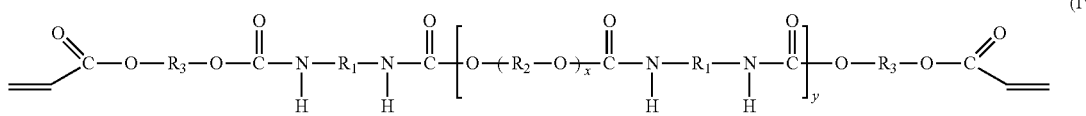

and the second component is a di-adduct compound having the molecular formula (V):

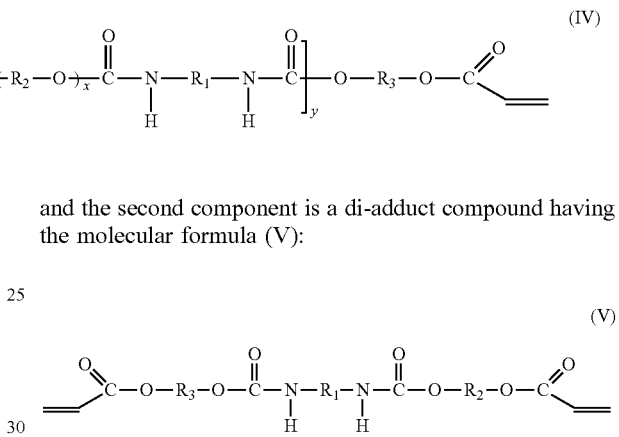

where the groups $R_1$, $R_2$, $R_3$, and the integer x are as described hereinabove, y is a positive integer, and it is understood that the group $R_1$ in molecular formulas (IV) and (V) is the same as group $R_1$ in molecular formula (I), the group $R_2$ in molecular formula (IV) is the same as group $R_2$ in molecular formula (II), and the group $R_3$ in molecular formulas (IV) and (V) is the same as group $R_3$ in molecular formula (III). The di-adduct compound corresponds to the compound formed by reaction of both terminal isocyanate groups of the diisocyanate compound of molecular formula (I) with the hydroxy acrylate compound of molecular formula (II) where the diisocyanate compound has undergone no reaction with the polyol of molecular formula (II).

The di-adduct compound is formed from a reaction of the diisocyanate compound with the hydroxy acrylate compound during the reaction used to form the oligomer. Alternatively, the di-adduct compound is formed independent of the reaction used to form the oligomer and is added to the product of the reaction used to form the polyether urethane diacrylate compound or to a purified form of the polyether urethane diacrylate compound. The hydroxy group of the hydroxy acrylate compound reacts with an isocyanate group of the diisocyanate compound to provide a terminal acrylate group. The reaction occurs at each isocyanate group of the diisocyanate compound to form the di-adduct compound. The di-adduct compound is present in the oligomer in an amount of at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt % to 10.0 wt %, or in the range from 2.0 wt % to 9.0 wt %, or in the range from 2.5 wt % to 6.0 wt %, or in the range from 3.0 wt % to 8.0 wt %, or in the range from 3.0 wt % to 5.0 wt %, or in the range from 3.0 wt % to 5.5 wt %, or in the range from 3.5 wt % to 5.0 wt %, or in the range from 3.5 wt % to 7.0 wt %. It is noted that the concentration of di-adduct is expressed in terms of wt % of the oligomer and not in terms of wt % in the coating composition.

An illustrative reaction for synthesizing an oligomer in accordance with the present disclosure includes reaction of a diisocyanate compound (4,4'-methylene bis(cyclohexyl isocyanate, which is also referred to herein as H12MDI) and a polyol (polypropylene glycol with $M_n$~4000 g/mol, which is also referred to herein as PPG4000) to form a polyether urethane diisocyanate compound with formula (VI):

H12MDI~PPG4000~H12MDI~PPG4000~H12MDI        (VI)

where "~" denotes a urethane linkage formed by the reaction of a terminal isocyanate group of H12MDI with a terminal alcohol group of PPG4000; and ~H12MDI, ~H12MDI~, and ~PPG4000~ refer to residues of H12MDI and PPG4000 remaining after the reaction; and $M_n$ refers to number average molecular weight. The polyether urethane diisocyanate compound has a repeat unit of the type ~(H12MDI~PPG4000)~. The particular polyether urethane diisocyanate shown includes two PPG4000 units. The reaction may also provide products having one PPG4000 unit, or three or more PPG4000 units. The polyether urethane diisocyanate and any unreacted H12MDI include terminal isocyanate groups. In accordance with the present disclosure, a hydroxy acrylate compound (such as 2-hydroxyethyl acrylate, which is referred to herein as HEA) is included in the reaction to react with terminal isocyanate groups to convert them to terminal acrylate groups. The conversion of terminal isocyanate groups to terminal acrylate groups effects a quenching of the isocyanate group. The amount of HEA included in the reaction may be an amount estimated to react stoichiometrically with the expected concentration of unreacted isocyanate groups or an amount in excess of the expected stoichiometric amount. Reaction of HEA with the polyether urethane diisocyanate compound forms the polyether urethane acrylate compound with formula (VII):

HEA~H12MDI~PPG4000~H12MDI~PPG4000~H12MDI        (VII)

and/or the polyether urethane diacrylate compound with formula (VIII):

HEA~H12MDI~PPG4000~H12MDI~PPG4000~
H12MDI~HEA        (VII)

and reaction of HEA with unreacted H12MDI forms the di-adduct compound with formula (IX):

HEA~H12MDI~HEA        (IX)

where, as above, ~ designates a urethane linkage and ~HEA designates the residue of HEA remaining after reaction to form the urethane linkage (consistent with formulas (IV) and (V)). The combination of a polyether urethane diacrylate compound and a di-adduct compound in the product composition constitutes an oligomer in accordance with the present disclosure. As described more fully hereinbelow, when one or more oligomers are used in coating compositions, coatings having improved tear strength and critical stress characteristics result. In particular, it is demonstrated that oligomers having a high proportion of di-adduct compound provide coatings with high tear strengths and/or high critical stress values.

Although depicted for the illustrative combination of H12MDI, HEA and PPG4000, the foregoing reaction may be generalized to an arbitrary combination of a diisocyanate compound, a hydroxy acrylate compound, and a polyol, where the hydroxy acrylate compound reacts with terminal isocyanate groups to form terminal acrylate groups and where urethane linkages form from reactions of isocyanate groups and alcohol groups of the polyol or hydroxy acrylate compound.

The oligomer includes a compound that is a polyether urethane diacrylate compound with formula (X):

(hydroxy acrylate)~(diisocyanate~polyol)$_x$~diisocyanate~(hydroxy acrylate)        (X)

and a compound that is a di-adduct compound with formula (XI):

(hydroxy acrylate)~diisocyanate~(hydroxy acrylate)        (XI)

where the relative proportions of diisocyanate compound, hydroxy acrylate compound, and polyol used in the reaction to form the oligomer correspond to the mole numbers n, m, and p disclosed hereinabove.

Compounds represented by molecular formulas (I) and (II) above, for example, react to form a polyether urethane diisocyanate compound represented by molecular formula (XII):

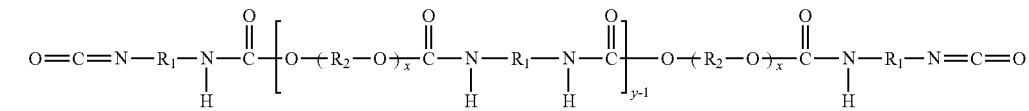

(XII)

where y is the same as y in formula (IV) and is 1, or 2, or 3 or 4 or higher; and x is determined by the number of repeat units of the polyol (as described hereinabove).

Further reaction of the polyether urethane isocyanate of molecular formula (VI) with the hydroxy acrylate of molecular formula (III) provides the polyether urethane diacrylate compound represented by molecular formula (IV) referred to hereinabove and repeated below:

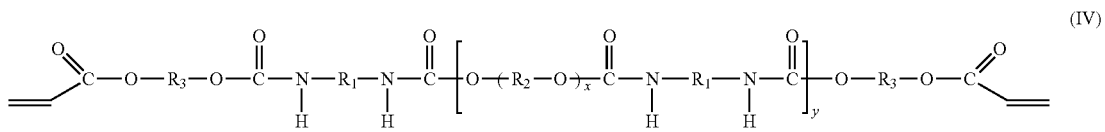

(IV)

where y is 1, or 2, or 3, or 4 or higher; and x is determined by the number of repeat units of the polyol (as described hereinabove).

In an embodiment, the reaction between the diisocyanate compound, hydroxy acrylate compound, and polyol yields a series of polyether urethane diacrylate compounds that differ in y such that the average value of y over the distribution of compounds present in the final reaction mixture is a non-integer. In an embodiment, the average value of y in the polyether urethane diisocyanates and polyether urethane diacrylates of molecular formulas (VI) and (IV) corresponds to p or p−1 (where p is as defined hereinabove). In an embodiment, the average number of occurrences of the group $R_1$ in the polyether urethane diisocyanates and polyether urethane diacrylates of the molecular formulas (XII) and (IV) correspond to n (where n is as defined hereinabove).

The relative proportions of the polyether urethane diacrylate and di-adduct compounds produced in the reaction are controlled by varying the molar ratio of the mole numbers n, m, and p. By way of illustration, the case where p=2.0 is considered. In the theoretical limit of complete reaction, two equivalents p of polyol would react with three equivalents n of a diisocyanate to form a compound having molecular formula (VI) in which y=2. The compound includes two terminal isocyanate groups, which can be quenched with subsequent addition of two equivalents m of a hydroxy acrylate compound in the theoretical limit to form the corresponding polyether urethane diacrylate compound (IV) with y=2. A theoretical molar ratio n:m:p=3.0:2.0:2.0 is defined for this situation.

In the foregoing exemplary theoretical limit, a reaction of diisocyanate, hydroxy acrylate, and polyol in the theoretical molar ratio n:m:p=3.0:2.0:2.0 provides a polyether urethane diacrylate compound having molecular formula (IV) in which y=2 without forming a di-adduct compound. Variations in the mole numbers n, m, and p provide control over the relative proportions of polyether urethane diacrylate and di-adduct formed in the reaction. Increasing the mole number n relative to the mole number m or the mole number p, for example, may increase the amount of di-adduct compound formed in the reaction. Reaction of the diisocyanate compound, the hydroxy acrylate compound, and polyol compound in molar ratios n:m:p, where n is in the range from 3.0 to 5.0, m is in the range within ±15% of 2n−4 or within ±10% of 2n−4 or within ±5% of 2n−4, and p is 2.0, for example, produce amounts of the di-adduct compound in the oligomer sufficient to achieve the preferred primary coating properties. By way of example, the embodiment in which n=4.0, m is within ±15% of 2n−4, and p=2.0 means that n=4.0, m is within ±15% of 4, and p=2.0, which means that that n=4.0, m is in the range from 3.4 to 4.6, and p=2.0.

Variations in the relative proportions of di-adduct and polyether urethane diacrylate are obtained through changes in the mole numbers n, m, and p and through such variations, it is possible to precisely control the Young's modulus, in situ modulus, tear strength, critical stress, tensile toughness, and other mechanical properties of coatings formed from coating compositions that include the oligomer. In one embodiment, control over properties is achievable by varying the number of units of polyol in the polyether urethane diacrylate compound (e.g. p=2.0 vs. p=3.0 vs. p=4.0). In another embodiment, control of tear strength, tensile toughness, and other mechanical properties is achieved by varying the proportions polyether urethane diacrylate compound and di-adduct compound. For a polyether urethane compound with a given number of polyol units, oligomers having variable proportions of di-adduct compound can be prepared. The variability in proportion of di-adduct compound can be finely controlled to provide oligomers based on a polyether urethane diacrylate compound with a fixed number of polyol units that provide coatings that offer precise or targeted values of tear strength, critical stress, tensile toughness, or other mechanical properties.

Improved fiber primary coatings result when utilizing a primary coating composition that incorporates an oligomer that includes a polyether urethane acrylate compound represented by molecular formula (IV) and a di-adduct compound represented by molecular formula (V), where concentration of the di-adduct compound in the oligomer is at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt % to 10.0 wt %, or in the range from 2.0 wt % to 9.0 wt %, or in the range from 3.0 wt % to 8.0 wt %, or in the range from 3.5 wt % to 7.0 wt % or in the range from 2.5 wt % to 6.0 wt %, or in the range from 3.0 wt % to 5.5 wt %, or in the range from 3.5 wt % to 5.0 wt %. It is noted that the concentration of di-adduct is expressed in terms of wt % of the oligomer and not in terms of wt % in the coating composition. The concentration of the di-adduct compound is increased in one embodiment by varying the molar ratio n:m:p of diisocyanate:hydroxy acrylate:polyol. In one aspect, molar ratios n:m:p that are rich in diisocyanate relative to polyol promote the formation of the di-adduct compound.

In the exemplary stoichiometric ratio n:m:p=3:2:2 described hereinabove, the reaction proceeds with p equivalents of polyol, n=p+1 equivalents of diisocyanate, and two equivalents of hydroxy acrylate. If the mole number n exceeds p+1, the diisocyanate compound is present in excess relative to the amount of polyol compound needed to form the polyether urethane acrylate of molecular formula (IV). The presence of excess diisocyanate shifts the distribution of reaction products toward enhanced formation of the di-adduct compound.

To promote formation of the di-adduct compound from excess diisocyanate compound, the amount of hydroxy acrylate can also be increased. For each equivalent of diisocyanate above the stoichiometric mole number n=p+1, two equivalents of hydroxy acrylate are needed to form the di-adduct compound. In the case of arbitrary mole number p (polyol), the stoichiometric mole numbers n (diisocyanate) and m (hydroxy acrylate) are p+1 and 2, respectively. As the mole number n is increased above the stoichiometric value, the equivalents of hydroxy acrylate needed for complete reaction of excess diisocyanate to form the di-adduct compound may be expressed as m=2+2[n−(p+1)], where the leading term "2" represents the equivalents of hydroxy acrylate needed to terminate the polyether urethane acrylate compound (compound having molecular formula (V)) and the term 2[n−(p+1)] represents the equivalents of hydroxy acrylate needed to convert the excess starting diisocyanate to the di-adduct compound. If the actual value of the mole number m is less than this number of equivalents, the available hydroxy acrylate reacts with isocyanate groups present on the oligomer or free diisocyanate molecules to form terminal acrylate groups. The relative kinetics of the two reaction pathways dictates the relative amounts of polyether urethane diacrylate and di-adduct compounds formed and the deficit in hydroxy acrylate relative to the amount required to quench all unreacted isocyanate groups may be controlled to further influence the relative proportions of polyether urethane diacrylate and di-adduct formed in the reaction.

In some embodiments, the reaction includes heating the reaction composition formed from the diisocyanate compound, hydroxy acrylate compound, and polyol. The heating facilitates conversion of terminal isocyanate groups to terminal acrylate groups through a reaction of the hydroxy acrylate compound with terminal isocyanate groups. In different embodiments, the hydroxy acrylate compound is present in excess in the initial reaction mixture and/or is otherwise available or added in unreacted form to effect conversion of terminal isocyanate groups to terminal acrylate groups. The heating occurs at a temperature above 40° C. for at least 12 hours, or at a temperature above 40° C. for at least 18 hours, or at a temperature above 40° C. for at least 24 hours, or at a temperature above 50° C. for at least 12 hours, or at a temperature above 50° C. for at least 18 hours, or at a temperature above 50° C. for at least 24 hours, or at a temperature above 60° C. for at least 12 hours, or at a temperature above 60° C. for at least 18 hours, or at a temperature above 60° C. for at least 24 hours.

In an embodiment, conversion of terminal isocyanate groups on the polyether urethane diacrylate compound or starting diisocyanate compound (unreacted initial amount or amount present in excess) to terminal acrylate groups is facilitated by the addition of a supplemental amount of hydroxy acrylate compound to the reaction mixture. As indicated hereinabove, the amount of hydroxy acrylate compound needed to quench (neutralize) terminal isocyanate groups may deviate from the theoretical number of equivalents due, for example, to incomplete reaction or a desire to control the relative proportions of polyether urethane diacrylate compound and di-adduct compound. As described hereinabove, once the reaction has proceeded to completion or other endpoint, it is preferable to quench (neutralize) residual isocyanate groups to provide a stabilized reaction product. In an embodiment, supplemental hydroxy acrylate is added to accomplish this objective.

In an embodiment, the amount of supplemental hydroxy acrylate compound is in addition to the amount included in the initial reaction process. The presence of terminal isocyanate groups at any stage of the reaction is monitored, for example, by FTIR spectroscopy (e.g. using a characteristic isocyanate stretching mode near 2265 cm$^{-1}$) and supplemental hydroxy acrylate compound is added as needed until the intensity of the characteristic stretching mode of isocyanate groups is negligible or below a pre-determined threshold. In an embodiment, supplemental hydroxy acrylate compound is added beyond the amount needed to fully convert terminal isocyanate groups to terminal acrylate groups. In different embodiments, supplemental hydroxy acrylate compound is included in the initial reaction mixture (as an amount above the theoretical amount expected from the molar amounts of diisocyanate and polyol), added as the reaction progresses, and/or added after reaction of the diisocyanate and polyol compounds has occurred to completion or pre-determined extent.

Amounts of hydroxy acrylate compound above the amount needed to fully convert isocyanate groups are referred to herein as excess amounts of hydroxy acrylate compound. When added, the excess amount of hydroxy acrylate compound is at least 20% of the amount of supplemental hydroxy acrylate compound needed to fully convert terminal isocyanate groups to terminal acrylate groups, or at least 40% of the amount of supplemental hydroxy acrylate compound needed to fully convert terminal isocyanate groups to terminal acrylate groups, or at least 60% of the amount of supplemental hydroxy acrylate compound needed to fully convert terminal isocyanate groups to terminal acrylate groups, or at least 90% of the amount of supplemental hydroxy acrylate compound needed to fully convert terminal isocyanate groups to terminal acrylate groups.

In an embodiment, the amount of supplemental hydroxy acrylate compound may be sufficient to completely or nearly completely quench residual isocyanate groups present in the oligomer formed in the reaction. Quenching of isocyanate groups is desirable because isocyanate groups are relatively unstable and often undergo reaction over time. Such reaction alters the characteristics of the reaction composition or oligomer and may lead to inconsistencies in coatings formed therefrom. Reaction compositions and products formed from the starting diisocyanate and polyol compounds that are free of residual isocyanate groups are expected to have greater stability and predictability of characteristics.

The oligomer of the primary coating composition includes a polyether urethane diacrylate compound and di-adduct compound as described hereinabove. In some embodiments, the oligomer includes two or more polyether urethane diacrylate compounds and/or two or more di-adduct compounds. The oligomer content of the primary coating composition includes the combined amounts of the one or more polyether urethane diacrylate compound(s) and one or more di-adduct compound(s) and is greater than 20 wt %, or greater than 30 wt %, or greater than 40 wt %, or in the range from 20 wt % to 80 wt %, or in the range from 30 wt % to 70 wt %, or in the range from 40 wt % to 60 wt %, where the concentration of di-adduct compound within the oligomer content is as described above.

The curable primary coating composition further includes one or more monomers. The one or more monomers is/are selected to be compatible with the oligomer, to control the viscosity of the primary coating composition to facilitate processing, and/or to influence the physical or chemical properties of the coating formed as the cured product of the primary coating composition. The monomers include radiation-curable monomers such as ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—, or —O—CH(CH$_3$)—CH$_2$—), etc. As used herein, the degree of alkoxylation refers to the number of alkoxylene groups in the monomer. In one embodiment, the alkoxylene groups are bonded consecutively in the monomer.

In some embodiments, the primary coating composition includes an alkoxylated monomer of the form R$_4$—R$_5$—O—(CH(CH$_3$)CH$_2$—O)$_q$—C(O)CH=CH$_2$, where R$_4$ and R$_5$ are aliphatic, aromatic, or a mixture of both, and q=1 to 10, or R$_4$—O—(CH(CH$_3$)CH$_2$—O)$_q$—C(O)CH=CH$_2$, where C(O) is a carbonyl group, R$_1$ is aliphatic or aromatic, and q=1 to 10.

Representative examples of monomers include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., M164 available from Miwon Specialty Chemical Company Ltd., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

In some embodiments, the monomer component of the primary coating composition includes a multifunctional (meth)acrylate. Multifunctional ethylenically unsaturated monomers include multifunctional acrylate monomers and multifunctional methacrylate monomers. Multifunctional acrylates are acrylates having two or more polymerizable acrylate moieties per molecule, or three or more polymerizable acrylate moieties per molecule. Examples of multifunctional (meth)acrylates include dipentaerythritol monohydroxy pentaacrylate (e.g., PHOTOMER 4399 available from IGM Resins), methylolpropane polyacrylates with and without alkoxylation such as trimethylolpropane triacrylate and ditrimethylolpropane tetraacrylate (e.g., PHOTOMER 4355, IGM Resins), alkoxylated glyceryl triacrylates such as propoxylated glyceryl triacrylate with propoxylation being 3 or greater (e.g., PHOTOMER 4096, IGM Resins), and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol diacrylate, propoxylated hexanediol diacrylate, tetrapropyleneglycol diacrylate, pentapropyleneglycol diacrylate, methacrylate analogs of the foregoing, and combinations thereof.

In some embodiments, the primary coating composition includes an N-vinyl amide monomer such as an N-vinyl lactam, or N-vinyl pyrrolidinone, or N-vinyl caprolactam, where the N-vinyl amide monomer is present in the coating composition at a concentration greater than 1.0 wt %, or greater than 2.0 wt %, or greater than 3.0 wt %, or in the range from 1.0 wt % to 15.0 wt %, or in the range from 2.0 wt % to 10.0 wt %, or in the range from 3.0 wt % to 8.0 wt %.

In an embodiment, the primary coating composition includes one or more monofunctional acrylate or methacrylate monomers in an amount from 15 wt % to 90 wt %, or from 30 wt % to 75 wt %, or from 40 wt % to 65 wt %. In another embodiment, the primary coating composition may include one or more monofunctional aliphatic epoxy acrylate or methacrylate monomers in an amount from 5 wt % to 40 wt %, or from 10 wt % to 30 wt %.

In an embodiment, the monomer component of the primary coating composition includes a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono (meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth) acrylate, 3-hydroxypropyl (meth)acrylate, and 4-hydroxybutyl (meth)acrylate (each available from Aldrich).

In an embodiment, the hydroxyfunctional monomer is present in an amount sufficient to improve adhesion of the primary coating to the optical fiber. The hydroxyfunctional monomer is present in the coating composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the coating. Hydroxyfunctional monomers are described in more detail in U.S. Pat. No. 6,563,996, the disclosure of which is hereby incorporated by reference in its entirety.

In different embodiments, the total monomer content of the primary coating composition is between about 15 wt % and about 90 wt %, or between about 30 wt % and about 75 wt %, or between about 40 wt % and about 65 wt %.

In addition to a curable monomer and a curable oligomer, the curable primary coating composition also includes a polymerization initiator. The polymerization initiator facilitates initiation of the polymerization process associated with the curing of the primary coating composition to form the coating. Polymerization initiators include thermal initiators, chemical initiators, electron beam initiators, and photoinitiators. Photoinitiators include ketonic photoinitiators and/or phosphine oxide photoinitiators. When used in the curing of the coating composition, the photoinitiator is present in an amount sufficient to enable rapid radiation curing.

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The coating composition includes a single photoinitiator or a combination of two or more photoinitiators. The total photoinitiator content of the coating composition is up to about 10 wt %, or between about 0.5 wt % and about 6 wt %.

The curable primary coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the primary coating composition (e.g., protect against de-polymerization or oxidative degradation).

An adhesion promoter is a compound that facilitates adhesion of the primary coating and/or primary composition to glass (e.g. the cladding portion of a glass fiber). Suitable adhesion promoters include alkoxysilanes, mercapto-functional silanes, organotitanates, and zirconates. Representative adhesion promoters include mercaptoalkyl silanes or mercaptoalkoxy silanes such as 3-mercaptopropyl-trialkoxysilane (e.g., 3-mercaptopropyl-trimethoxysilane, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, the disclosure of which is hereby incorporated by reference in its entirety herein.

The adhesion promoter is present in the primary coating composition in an amount between 0.02 wt % and 10.0 wt %, or between 0.05 wt % and 4.0 wt %, or between 0.1 wt % and 4.0 wt %, or between 0.1 wt % and 3.0 wt %, or between 0.1 wt % and 2.0 wt %, or between 0.1 wt % and 1.0 wt %, or between 0.5 wt % and 4.0 wt %, or between 0.5 wt % and 3.0 wt %, or between 0.5 wt % and 2.0 wt %, or between 0.5 wt % to 1.0 wt %.

A representative antioxidant is thiodiethylene bis[3-(3,5-di-tert-butyl)-4-hydroxy-phenyl) propionate] (e.g., IRGANOX 1035, available from BASF). In some aspects, an antioxidant is present in the coating composition in an amount greater than 0.25 wt %, or greater than 0.50 wt %, or greater than 0.75 wt %, or greater than 1.0 wt %, or an amount in the range from 0.25 wt % to 3.0 wt %, or an amount in the range from 0.50 wt % to 2.0 wt %, or an amount in the range from 0.75 wt % to 1.5 wt %.

Representative optical brighteners include TINOPAL OB (available from BASF); Blankophor KLA (available from Bayer); bisbenzoxazole compounds; phenylcoumarin compounds; and bis(styryl)biphenyl compounds. In an embodiment, the optical brightener is present in the coating composition at a concentration of 0.005 wt % to 0.3 wt %.

Representative amine synergists include triethanolamine; 1,4-diazabicyclo[2.2.2]octane (DABCO), triethylamine, and methyldiethanolamine. In an embodiment, an amine synergist is present at a concentration of 0.02 wt % to 0.5 wt %.

Primary Coating—Properties.

Relevant properties of the primary coating include radius, thickness, Young's modulus, and in situ modulus.

The radius $r_5$ of the primary coating is less than or equal to 85.0 µm, or less than or equal to 80.0 µm, or less than or equal to 75.0 µm, or less than or equal to 70.0 µm, or less than or equal to 65.0 µm, or less than or equal to 60.0 µm, or less than or equal to 55.0 µm, or less than or equal to 50.0 µm, or in the range from 47.5 µm to 85.0 µm, or in the range from 50.0 µm to 80.0 µm, or in the range from 55.0 µm to 75.0 µm, or in the range from 75.0 µm to 85.0 µm, or in the range from 77.5 µm to 82.5 µm, or in the range from 57.5 µm to 67.5 µm, or in the range from 60.0 µm to 65.0 µm, or in the range from 47.5 µm to 52.5.

To facilitate decreases in the diameter of the optical fiber, it is preferable to minimize the thickness $r_5-r_4$ of the primary coating. The thickness $r_5-r_4$ of the primary coating is less than or equal to 30.0 µm, or less than or equal to 25.0 µm, or less than or equal to 20.0 µm, or less than or equal to 15.0 µm, or less than or equal to 10.0 µm, or in the range from 7.5 µm to 30.0 µm, or in the range from 10.0 µm to 30.0 µm, or in the range from 12.5 µm to 27.5 µm, or in the range from 12.5 µm to 25.0 µm, or in the range from 15.0 µm to 30.0 µm, or in the range from 15.0 µm to 27.5 µm, or in the range from 15.0 µm to 25.0 µm, or in the range from 15.0 µm to 20.0 µm, or in the range from 20.0 µm to 35.0 µm, or in the range from 7.5 µm to 12.5 µm.

In some embodiments, the optical fiber includes a glass fiber with a radius $r_4$ in the range from 60.0 µm to 65.0 µm and a primary coating with a radius $r_5$ less than or equal to 90.0 µm, or less than or equal to 85.0 µm, or less than or equal to 80.0 µm, or less than or equal to 75.0 µm, or in the range from 75.0 µm to 85.0 µm, or in the range from 77.5 µm to 82.5 µm.

In some embodiments, the optical fiber includes a glass fiber with a radius $r_4$ in the range from 60.0 µm to 65.0 µm and a primary coating with a thickness $r_5-r_4$ less than or equal to 30.0 µm, or less than or equal to 25.0 µm, or less than or equal to 20.0 µm, or in the range from 10.0 µm to 30.0 µm, or in the range from 12.5 µm to 27.5 µm, or in the range from 12.5 µm to 25.0 µm, or in the range from 15.0 µm to 30.0 µm, or in the range from 15.0 µm to 27.5 µm, or in the range from 15.0 µm to 20.0 µm.

To facilitate effective buffering of stress and protection of the glass fiber, it is preferable for the primary coating to have a low Young's modulus and/or a low in situ modulus. The Young's modulus of the primary coating is less than or equal to 0.7 MPa, or less than or equal to 0.6 MPa, or less than or equal to 0.5 MPa, or less than or equal to 0.4 MPa, or in the range from 0.1 MPa to 0.7 MPa, or in the range from 0.3 MPa to 0.6 MPa. The in situ modulus of the primary coating is less than or equal to 0.30 MPa, or less than or equal to 0.25 MPa, or less than or equal to 0.20 MPa, or less than or equal to 0.15 MPa, or less than or equal to 0.10 MPa, or in the range from 0.05 MPa to 0.25 MPa, or in the range from 0.10 MPa to 0.20 MPa.

Secondary Coating—Compositions.

The secondary coating is a cured product of a curable secondary coating composition that includes a monomer, a photoinitiator, and an optional additive. In a preferred embodiment, the secondary coating and curable secondary coating composition are urethane free. The present disclosure describes radiation-curable secondary coating compositions, cured products of the radiation-curable secondary coating compositions, optical fibers coated with a radiation-curable secondary coating composition, and optical fibers coated with the cured product of a radiation-curable secondary coating composition.

The secondary coating is formed as the cured product of a radiation-curable secondary coating composition that includes a monomer component with one or more monomers. The monomers preferably include ethylenically unsaturated compounds. The one or more monomers are present in an amount of 50 wt % or greater, or in an amount from about 60 wt % to about 99 wt %, or in an amount from about 75 wt % to about 99 wt %, or in an amount from about 80 wt % to about 99 wt % or in an amount from about 85 wt % to about 99 wt %. In a preferred embodiment, none of the monomers of the monomer component includes a urethane linkage.

The monomers include functional groups that are polymerizable groups and/or groups that facilitate or enable cross-linking. The monomers are monofunctional monomers or multifunctional monomers. In combinations of two or more monomers, the constituent monomers are monofunctional monomers, multifunctional monomers, or a combination of monofunctional monomers and multifunctional monomers. In one embodiment, the monomer component of the curable secondary coating composition includes ethylenically unsaturated monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers for the curable secondary coating composition include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Other representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—), etc.

As used herein, degree of alkoxylation refers to the number of alkoxylene groups divided by the number of acrylate and methacrylate groups in a molecule of the monomer. For monofunctional alkoxylated monomers, the degree of alkoxylation corresponds to the number of alkoxylene groups in a molecule of the monomer. In a preferred embodiment, the alkoxylene groups of a monofunctional alkoxylated monomer are bonded consecutively. For a difunctional alkoxylated monomer, the degree of alkoxylation corresponds to one half of the number of alkoxylene groups in a molecule of the monomer. In a preferred embodiment, the alkoxylene groups in a difunctional alkoxylated monomer are bonded consecutively in each of two groups where the two groups are separated by a chemical linkage and each group includes half or approximately half of the number of alkoxylene groups in the molecule. For a trifunctional alkoxylated monomer, the degree of alkoxylation corresponds to one third of the number of alkoxylene groups in a molecule of the monomer. In a preferred embodiment, the alkoxylene groups in a trifunctional alkoxylated monomer are bonded consecutively in three groups, where the three groups are separated by chemical linkages and each group includes a third or approximately a third of the number of alkoxylene groups in the molecule.

Representative multifunctional ethylenically unsaturated monomers for the curable secondary coating composition include, without limitation, alkoxylated bisphenol-A diacrylates, such as ethoxylated bisphenol-A diacrylate, and alkoxylated trimethylolpropane triacrylates, such as ethoxylated trimethylolpropane triacrylate, with the degree of alkoxylation being 2 or greater, or 4 or greater, or 6 or greater, or less than 16 or less than 12, or less than 8, or less than 5, or in the range from 2 to 16, or in the range from 2 to 12, or in the range from 2 to 8, or in the range from 2 to 4, or in the range from 3 to 12, or in the range from 3 to 8, or in the range from 3 to 5, or in the range from 4 to 12, or in the range from 4 to 10, or in the range from 4 to 8.

Multifunctional ethylenically unsaturated monomers of the curable secondary coating composition include ethoxylated bisphenol-A diacrylate with a degree of ethoxylation ranging from 2 to 16 (e.g. SR349, SR601, and SR602 available from Sartomer Company, Inc. West Chester, Pa. and Photomer 4028, available from IGM Resins), or propoxylated bisphenol-A diacrylate with the degree of propoxylation being 2 or greater; for example, ranging from 2 to 16; methylolpropane polyacrylates with and without alkoxylation such as alkoxylated trimethylolpropane triacrylate or ethoxylated trimethylolpropane triacrylate with the degree of alkoxylation or ethoxylation being 2 or greater; for example, ranging from 2 to 16 or from 3 to 10 (e.g., Photomer 4149, IGM Resins, and SR499, Sartomer Company, Inc.); propoxylated-trimethylolpropane triacrylate with the degree of propoxylation being 2 or greater; for example, ranging from 2 to 16 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 2 or greater; for example, ranging from 2 to 16 (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from 2 to 16; epoxy acrylates formed by adding acrylate to bisphenol-A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

In some embodiments, the curable secondary coating composition includes a multifunctional monomer with three or more curable functional groups in an amount greater than 2.0 wt %, or greater than 5.0 wt %, or greater than 7.5 wt %, or greater than 10 wt %, or greater than 15 wt %, or greater than 20 wt %, or in the range from 2.0 wt % to 25 wt %, or in the range from 5.0 wt % to 20 wt %, or in the range from 8.0 wt % to 15 wt %. In a preferred embodiment, each of the three or more curable functional groups is an acrylate group.

In some embodiments, the curable secondary coating composition includes a trifunctional monomer in an amount greater than 2.0 wt %, or greater than 5.0 wt %, or greater than 7.5 wt %, or greater than 10 wt %, or greater than 15 wt %, or greater than 20 wt %, or in the range from 2.0 wt % to 25 wt %, or in the range from 5.0 wt % to 20 wt %, or in the range from 8.0 wt % to 15 wt %. In a preferred embodiment, the trifunctional monomer is a triacrylate monomer.

In some embodiments, the curable secondary coating composition includes a difunctional monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition lacks a monofunctional monomer and includes a difunctional monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition lacks a monofunctional monomer and includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes two or more trifunctional monomers in a combined amount in the range from 2.0 wt % to 25 wt %, or in the range from 5.0 wt % to 20 wt %, or in the range from 8.0 wt % to 15 wt %. In a preferred embodiment, each of the two or more difunctional monomers is a diacrylate monomer and each of the two or more trifunctional monomers is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition lacks a monofunctional monomer and includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes two or more trifunctional monomers in a combined amount in the range from 2.0 wt % to 25 wt %, or in the range from 5.0 wt % to 20 wt %, or in the range from 8.0 wt % to 15 wt %. In a preferred embodiment, the each of the difunctional monomers is a diacrylate monomer and each of the trifunctional monomers is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

A preferred difunctional monomer is an alkoxylated bisphenol-A diacrylate. Alkoxylated bisphenol-A diacrylate has the general formula (XIII):

alkyl] isocyanurate is tris[2-hydroxyethyl) isocyanurate triacrylate, which has the general formula (XV):

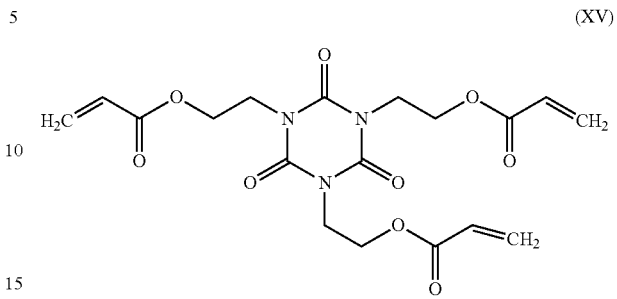

(XV)

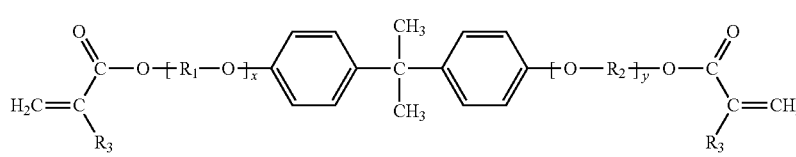

(XIII)

where $R_1$ and $R_2$ are alkylene groups, $R_1$—O and $R_2$—O are alkoxylene groups, and $R_3$ is H. Any two of the groups $R_1$, $R_2$, and $R_3$ are the same or different. In one embodiment, the groups $R_1$ and $R_2$ are the same. The number of carbons in each of the groups $R_1$ and $R_2$ is in the range from 1 to 8, or in the range from 2 to 6, or in the range from 2 to 4. The degree of alkoxylation is $\frac{1}{2}(x+y)$. The values of x and y are the same or different. In one embodiment, x and y are the same.

A preferred trifunctional monomer is an alkoxylated trimethylolpropane triacrylate. Alkoxylated trimethylolpropane triacrylate has the general formula (XIV):

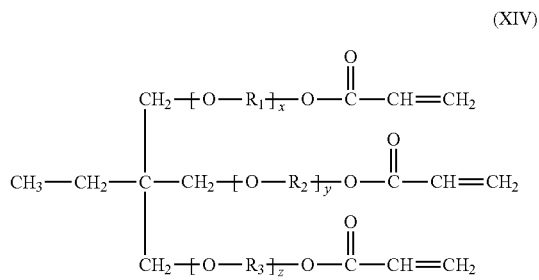

(XIV)

where $R_1$ and $R_2$ are alkylene groups, O—$R_1$, O—$R_2$, and O—$R_3$ are alkoxylene groups. Any two of the groups $R_1$, $R_2$, and $R_3$ are the same or different. In one embodiment, the groups $R_1$, $R_2$, and $R_3$ are the same. The number of carbons in the each of the groups $R_1$, $R_2$, and $R_3$ is in the range from 1 to 8, or in the range from 2 to 6, or in the range from 2 to 4. The degree of alkoxylation is $\frac{1}{3}(x+y+z)$. The values of any two of x, y and z are the same or different. In one embodiment, x, y, and z are the same.

Another preferred trifunctional monomer is a tris[(acryloyloxy)alkyl] isocyanurate. Tris[(acryloyloxy)alkyl] isocyanurates are also referred to as tris[n-hydroxyalkyl) isocyanurate triacrylates. A representative tris[(acryloyloxy)

In formula (III), an ethylene linkage (—$CH_2$—$CH_2$—) bonds each acryloyloxy group to a nitrogen of the isocyanurate ring. In other embodiments of tris[(acryloyloxy)alkyl] isocyanurates, alkylene linkages other than ethylene bond the acryloyloxy groups to nitrogen atoms of the isocyanurate ring. The alkylene linkages for any two of the three alkylene linkages are the same or different. In one embodiment, the three alkylene linkages are the same. The number of carbons in each of the alkylene linkages is in the range from 1 to 8, or in the range from 2 to 6, or in the range from 2 to 4.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The curable secondary coating composition includes a single photoinitiator or a combination of two or more photoinitiators. The total photoinitiator content of the curable secondary coating composition is up to about 10 wt %, or between about 0.5 wt % and about 6 wt %.

Optional additives include a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the curable secondary coating composition (e.g., protect against de-polymerization or oxidative degradation).

A representative antioxidant is thiodiethylene bis[3-(3,5-di-tert-butyl)-4-hydroxy-phenyl) propionate] (e.g., IRGANOX 1035, available from BASF). In some aspects, an antioxidant is present in the curable secondary coating composition in an amount greater than 0.25 wt %, or greater than 0.50 wt %, or greater than 0.75 wt %, or greater than 1.0 wt %, or an amount in the range from 0.25 wt % to 3.0 wt %, or an amount in the range from 0.50 wt % to 2.0 wt %, or an amount in the range from 0.75 wt % to 1.5 wt %.

Representative optical brighteners include TINOPAL OB (available from BASF); Blankophor KLA (available from Bayer); bisbenzoxazole compounds; phenylcoumarin compounds; and bis(styryl)biphenyl compounds. In an embodiment, the optical brightener is present in the curable secondary coating composition at a concentration of 0.005 wt % to 0.3 wt %.

Representative amine synergists include triethanolamine; 1,4-diazabicyclo[2.2.2]octane (DABCO), triethylamine, and methyldiethanolamine. In an embodiment, an amine synergist is present at a concentration of 0.02 wt % to 0.5 wt %.

Secondary Coating—Properties.

Relevant properties of the secondary coating include radius, thickness, Young's modulus, tensile strength, yield strength, elongation at yield, glass transition temperature, and puncture resistance.

The radius $r_6$ of the secondary coating is less than or equal to 110.0 µm, or less than or equal to 100.0 µm, or less than or equal to 90.0 µm, or less than or equal to 85.0 µm, or less than or equal to 80.0 µm, or less than or equal to 75.0 µm, or less than or equal to 70.0 µm, or less than or equal to 65.0 µm, or less than or equal to 62.5 µm, or in the range from 62.5 µm to 110.0 µm, or in the range from 72.5 µm to 100.0 µm, or in the range from 75.0 µm to 90.0 µm, or in the range from 95.0 µm to 105.0 µm, or in the range from 75.0 µm to 85.0 µm, or in the range from 62.5 µm to 67.5 µm.

To facilitate decreases in the diameter of the optical fiber, it is preferable to minimize the thickness $r_6-r_5$ of the secondary coating. The thickness $r_6-r_5$ of the secondary coating is less than or equal to 30.0 µm, or less than or equal to 25.0 µm, or less than or equal to 20.0 µm, or less than or equal to 15.0 µm, or less than or equal to 10.0 µm, or in the range from 7.5 µm to 30.0 µm, or in the range from 10.0 µm to 30.0 µm, or in the range from 10.0 µm to 20.0 µm, or in the range from 10.0 µm to 15.0 µm, or in the range from 12.5 µm to 27.5 µm, or in the range from 12.5 µm to 25.0 µm, or in the range from 12.5 µm to 22.5 µm, or in the range from 15.0 µm to 30.0 µm, or in the range from 15.0 µm to 27.5 µm, or in the range from 15.0 µm to 25.0 µm.

In some embodiments, the optical fiber includes a glass fiber with a radius $r_4$ in the range from 60.0 µm to 65.0 µm; a primary coating with a radius $r_5$ less than or equal to 90.0 µm, or less than or equal to 85.0 µm, or less than or equal to 80.0 µm, or less than or equal to 75.0 µm, or in the range from 75.0 µm to 85.0 µm, or in the range from 77.5 µm to 82.5 µm, and a secondary coating with a radius $r_6$ less than or equal to than or equal to 110.0 µm, or less than or equal to 100.0 µm, or less than or equal to 90.0 µm, or less than or equal to 85.0 µm, or less than or equal to 80.0 µm, or less than or equal to 75.0 µm, or less than or equal to 70.0 µm, or in the range from 70.0 µm to 110.0 µm, or in the range from 80.0 µm to 110.0 µm, or in the range from 90.0 µm to 105.0 µm, or in the range from 95.0 µm to 105.0 µm.

In some embodiments, the optical fiber includes a glass fiber with a radius $r_4$ in the range from 60.0 µm to 65.0 µm; a primary coating with a thickness $r_5-r_4$ less than or equal to 30.0 µm, or less than or equal to 25.0 µm, or less than or equal to 20.0 µm, or less than or equal to 15.0 µm, or in the range from 10.0 µm to 30.0 µm, or in the range from 12.5 µm to 27.5 µm, or in the range from 12.5 µm to 25.0 µm, or in the range from 15.0 µm to 30.0 µm, or in the range from 15.0 µm to 27.5 µm, or in the range from 15.0 µm to 25.0 µm; and a secondary coating with a radius $r_6$ less than or equal to than or equal to 110.0 µm, or less than or equal to 100.0 µm, or less than or equal to 90.0 µm, or less than or equal to 85.0 µm, or less than or equal to 80.0 µm, or less than or equal to 75.0 µm, or less than or equal to 70.0 µm, or in the range from 70.0 µm to 110.0 µm, or in the range from 72.5 µm to 100.0 µm, or in the range from 75.0 µm to 90.0 µm.

Fiber Draw Process.

In a continuous optical fiber manufacturing process, a glass fiber is drawn from a heated preform and sized to a target diameter. The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

In some processes, the coating system further applies a tertiary coating composition to the secondary coating and cures the tertiary coating composition to form a solidified tertiary coating. Typically, the tertiary coating is an ink layer used to mark the fiber for identification purposes and has a composition that includes a pigment and is otherwise similar to the secondary coating. The tertiary coating is applied to the secondary coating and cured. The secondary coating has typically been cured at the time of application of the tertiary coating. The primary, secondary, and tertiary coating compositions can be applied and cured in a common continuous manufacturing process. Alternatively, the primary and secondary coating compositions are applied and cured in a common continuous manufacturing process, the coated fiber is collected, and the tertiary coating composition is applied and cured in a separate offline process to form the tertiary coating.

The wavelength of curing radiation is infrared, visible, or ultraviolet (UV). Representative wavelengths include wavelengths in the range from 250 nm to 1000 nm, or in the range from 250 nm to 700 nm, or in the range from 250 nm to 450 nm, or in the range from 275 nm to 425 nm, or in the range from 300 nm to 400 nm, or in the range from 320 nm to 390 nm, or in the range from 330 nm to 380 nm, or in the range from 340 nm to 370 nm. Curing can be accomplished with light sources that include a lamp source (e.g. Hg lamp), an LED source (e.g. a UVLED, visible LED, or infrared LED), or a laser source.

Each of the primary, secondary, and tertiary compositions are curable with any of the wavelengths and any of the light sources referred to above. The same wavelength or source can be used to cure each of the primary, secondary, and tertiary compositions, or different wavelengths and/or different sources can be used to cure the primary, secondary, and tertiary compositions. Curing of the primary, secondary, and tertiary compositions can be accomplished with a single wavelength or a combination of two or more wavelengths.

To improve process efficiency, it is desirable to increase the draw speed of the fiber along the process pathway extending from the preform to the collection point. As the draw speed increases, however, the cure speed of coating compositions must increase. The coating compositions disclosed herein are compatible with fiber draw processes that operate at a draw speed greater than 35 m/s, or greater than 40 m/s, or greater than 45 m/s, or greater than 50 m/s, or greater than 55 m/s, or greater than 60 m/s, or greater than 65 m/s, or greater than 70 m/s.

The present disclosure extends to optical fibers coated with the cured product of the curable secondary coating compositions. The optical fiber includes a waveguiding glass fiber with a higher index glass core region surrounded by a lower index glass cladding region. A coating formed as a cured product of the curable secondary coating compositions surrounds and is in direct contact with a primary coating, which is in direct contact with the glass cladding.

The cured product of the curable secondary coating compositions can also function as a tertiary coating of the glass fiber.

Examples

The following examples illustrate preparation of a representative curable secondary coating compositions, cured products made from the curable secondary compositions, and properties of multimode optical fibers coated with the cured products of the curable secondary coating compositions. Corresponding properties of multimode optical fibers with a comparative secondary coating are also presented.

Measurement Techniques.

Properties of primary and secondary coatings were determined using the measurement techniques described below:

Tensile Properties.

The curable secondary coating compositions were cured and configured in the form of cured rod samples for measurement of Young's modulus, tensile strength at yield, yield strength, and elongation at yield. The cured rods were prepared by injecting the curable secondary composition into Teflon® tubing having an inner diameter of about 0.025". The rod samples were cured using a Fusion D bulb at a dose of about 2.4 J/cm$^2$ (measured over a wavelength range of 225-424 nm by a Light Bug model IL390 from International Light). After curing, the Teflon® tubing was stripped away to provide a cured rod sample of the secondary coating composition. The cured rods were allowed to condition for 18-24 hours at 23° C. and 50% relative humidity before testing. Young's modulus, tensile strength at break, yield strength, and elongation at yield were measured using a Sintech MTS Tensile Tester on defect-free rod samples with a gauge length of 51 mm, and a test speed of 250 mm/min. Tensile properties were measured according to ASTM Standard D882-97. The properties were determined as an average of at least five samples, with defective samples being excluded from the average.

In Situ Glass Transition Temperature.

In situ $T_g$ measurements of primary and secondary coatings were performed on fiber tube-off samples obtained from coated fibers. The coated fibers included a glass fiber having a diameter of 125 μm, a primary coating with thickness 32.5 μm surrounding and in direct contact with the glass fiber, and a secondary coating with thickness 26.0 μm surrounding and in direct contact with the glass fiber. The glass fiber and primary coating were the same for all samples measured. The primary coating was formed from the reference primary coating composition described below. Samples with a comparative secondary coating and a secondary coating in accordance with the present disclosure were measured.

The fiber tube-off samples were obtained using the following procedure: a 0.0055" Miller stripper was clamped down approximately 1 inch from the end of the coated fiber. The one-inch region of fiber was plunged into a stream of liquid nitrogen and held in the liquid nitrogen for 3 seconds. The coated fiber was then removed from the stream of liquid nitrogen and quickly stripped to remove the coating. The stripped end of the fiber was inspected for residual coating. If residual coating remained on the glass fiber, the sample was discarded and a new sample was prepared. The result of the stripping process was a clean glass fiber and a hollow tube of stripped coating that included intact primary and secondary coatings. The hollow tube is referred to as a "tube-off sample". The glass, primary and secondary coating diameter were measured from the end-face of the unstripped fiber.

In-situ Tg of the tube-off samples was run using a Rheometrics DMTA IV test instrument at a sample gauge length of 9 to 10 mm. The width, thickness, and length of the tube-off sample were input to the operating program of the test instrument. The tube-off sample was mounted and then cooled to approximately −85° C. Once stable, the temperature ramp was run using the following parameters:

Frequency: 1 Hz
Strain: 0.3%
Heating Rate: 2° C./min.
Final Temperature: 150° C.
Initial Static Force=20.0 g
Static>Dynamic Force by=10.0%

The in-situ Tg of a coating is defined as the maximum value of tan δ in a plot of tan δ as a function of temperature, where tan δ is defined as:

$$\tan \delta = E''/E'$$

and E" is the loss modulus, which is proportional to the loss of energy as heat in a cycle of deformation and E' is the storage or elastic modulus, which is proportional to the energy stored in a cycle of deformation.

The tube-off samples exhibited distinct maxima in the tan δ plot for the primary and secondary coatings. The maximum at lower temperature (about −50° C.) corresponded to the in-situ Tg for the primary coating and the maximum at higher temperature (above 50° C.) corresponded to the in-situ Tg for the secondary coating.

In Situ Modulus of Primary Coating.

The in situ modulus was measured using the following procedure. A six-inch sample of fiber was obtained and a one-inch section from the center of the fiber was window stripped and wiped with isopropyl alcohol. The window-stripped fiber was mounted on a sample holder/alignment stage equipped with 10 mm×5 mm rectangular aluminum tabs that were used to affix the fiber. Two tabs were oriented horizontally and positioned so that the short 5 mm sides were facing each other and separated by a 5 mm gap. The window-stripped fiber was laid horizontally on the sample holder across the tabs and over the gap separating the tabs. The coated end of one side of the window-stripped region of the fiber was positioned on one tab and extended halfway into the 5 mm gap between the tabs. The one-inch window-stripped region extended over the remaining half of the gap and across the opposing tab. After alignment, the sample was moved and a small dot of glue was applied to the half of each tab closest to the 5 mm gap. The fiber was then returned to position and the alignment stage was raised until the glue just touched the fiber. The coated end was then pulled away from the gap and through the glue such that the majority of the 5 mm gap between the tabs was occupied by the window-stripped region of the fiber. The portion of the window-stripped region remaining on the opposing tab was in contact with the glue. The very tip of the coated end was left to extend beyond the tab and into the gap between the tabs. This portion of the coated end was not embedded in the glue and was the object of the in situ modulus measurement. The glue was allowed to dry with the fiber sample in this configuration to affix the fiber to the tabs. After drying, the length of fiber fixed to each of the tabs was trimmed to 5 mm. The coated length embedded in glue, the non-embedded coated length (the portion extending into the gap between the tabs), and the primary diameter were measured.

The in situ modulus measurements were performed on a Rheometrics DMTA IV dynamic mechanical testing apparatus at a constant strain of 9e-6 1/s for a time of forty-five minutes at room temperature (21° C.). The gauge length was 15 mm. Force and the change in length were recorded and used to calculate the in situ modulus of the primary coating. The tab-mounted fiber samples were prepared by removing any epoxy from the tabs that would interfere with the 15 mm clamping length of the testing apparatus to insure that there was no contact of the clamps with the fiber and that the sample was secured squarely to the clamps. The instrument force was zeroed out. The tab to which the non-coated end of the fiber was affixed was then mounted to the lower clamp (measurement probe) of the testing apparatus and the tab to which the coated end of the fiber was affixed was mounted to the upper (fixed) clamp of the testing apparatus. The test was then executed and the sample was removed once the analysis was completed.

In Situ Modulus of Secondary Coating.

For secondary coatings, the in situ modulus was measured using fiber tube-off samples prepared from the fiber samples. A 0.0055 inch Miller stripper was clamped down approximately 1 inch from the end of the fiber sample. This one-inch region of fiber sample was immersed into a stream of liquid nitrogen and held for 3 seconds. The fiber sample was then removed and quickly stripped. The stripped end of the fiber sample was then inspected. If coating remained on the glass portion of the fiber sample, the tube-off sample was deemed defective and a new tube-off sample was prepared. A proper tube-off sample is one that stripped clean from the glass and consisted of a hollow tube with primary and secondary coating. The glass, primary and secondary coating diameter were measured from the end-face of the un-stripped fiber sample.

The fiber tube-off samples were run using a Rheometrics DMTA IV instrument at a sample gauge length 11 mm to obtain the in situ modulus of the secondary coating. The width, thickness, and length were determined and provided as input to the operating software of the instrument. The sample was mounted and run using a time sweep program at ambient temperature (21° C.) using the following parameters:

Frequency: 1 Rad/sec
Strain: 0.3%
Total Time=120 sec.
Time Per Measurement=1 sec
Initial Static Force=15.0 g
Static>Dynamic Force by=10.0%

Once completed, the last five E' (storage modulus) data points were averaged. Each sample was run three times (fresh sample for each run) for a total of fifteen data points. The averaged value of the three runs was reported.

Puncture Resistance of Secondary Coating.

Puncture resistance measurements were made on samples that included a glass fiber, a primary coating, and a secondary coating. The glass fiber had a diameter of 125 µm. The primary coating was formed from the reference primary coating composition listed in Table 1 below. Samples with various secondary coatings were prepared as described below. The thicknesses of the primary coating and secondary coating were adjusted to vary the cross-sectional area of the secondary coating as described below. The ratio of the thickness of the secondary coating to the thickness of the primary coating was maintained at about 0.8 for all samples.

The puncture resistance was measured using the technique described in the article entitled "Quantifying the Puncture Resistance of Optical Fiber Coatings", by G. Scott Glaesemann and Donald A. Clark, published in the Proceedings of the 52$^{nd}$ International Wire & Cable Symposium, pp. 237-245 (2003). A summary of the method is provided here. The method is an indentation method. A 4-centimeter length of optical fiber was placed on a 3 mm-thick glass slide. One end of the optical fiber was attached to a device that permitted rotation of the optical fiber in a controlled fashion. The optical fiber was examined in transmission under 100× magnification and rotated until the secondary coating thickness was equivalent on both sides of the glass fiber in a direction parallel to the glass slide. In this position, the thickness of the secondary coating was equal on both sides of the optical fiber in a direction parallel to the glass slide. The thickness of the secondary coating in the directions normal to the glass slide and above or below the glass fiber differed from the thickness of the secondary coating in the direction parallel to the glass slide. One of the thicknesses in the direction normal to the glass slide was greater and the other of the thicknesses in the direction normal to the glass slide was less than the thickness in the direction parallel to the glass slide. This position of the optical fiber was fixed by taping the optical fiber to the glass slide at both ends and is the position of the optical fiber used for the indentation test.

Indentation was carried out using a universal testing machine (Instron model 5500R or equivalent). An inverted microscope was placed beneath the crosshead of the testing machine. The objective of the microscope was positioned directly beneath a 75° diamond wedge indenter that was installed in the testing machine. The glass slide with taped fiber was placed on the microscope stage and positioned directly beneath the indenter such that the width of the indenter wedge was orthogonal to the direction of the optical fiber. With the optical fiber in place, the diamond wedge was lowered until it contacted the surface of the secondary coating. The diamond wedge was then driven into the secondary coating at a rate of 0.1 mm/min and the load on the secondary coating was measured. The load on the secondary coating increased as the diamond wedge was driven deeper into the secondary coating until puncture occurred, at which point a precipitous decrease in load was observed. The indentation load at which puncture was observed was recorded and is reported herein as grams of force (g) and referred to herein as "puncture load". The experiment was repeated with the optical fiber in the same orientation to obtain ten measurement points, which were averaged to determine a puncture load for the orientation. A second set of ten measurement points was taken by rotating the orientation of the optical fiber by 180°.

Macrobending Loss.

Macrobending loss was determined using the mandrel wrap test specified in standard IEC 60793-1-47. In the mandrel wrap test, the fiber is wrapped one or more times around a cylindrical mandrel having a specified diameter, and the increase in attenuation at a specified wavelength due to the bending is determined. Attenuation in the mandrel wrap test is expressed in units of dB/turn, where one turn refers to one revolution of the fiber about the mandrel. Macrobending losses at a wavelength of 850 nm and 1300 nm were determined for selected examples described below with the mandrel wrap test using mandrels with diameters of 15 mm and 30 mm.

Overfilled Launch (OFL) Bandwidth.

The overfilled launch (OFL) bandwidth was determined according to the procedures described in the standards ISO/IEC 11801 and ANSI/TIA-568-C.3.

Attenuation.

The attenuation was determined by winding a specified length of multimode optical fiber around a measurement spool using a wind tension of 25 g, launching light of a specified wavelength into the fiber and determining attenuation using optical time domain reflectometry (OTDR).

Separate measurements using launches from the overwrap and underwrap of the multimode optical fiber on the measurement spool were completed. Attenuation as a function of distance along the multimode optical fiber was measured and an average slope between two positions along the multimode optical fiber was determined. The two positions were selected sufficiently far from the ends of the multimode optical fiber to avoid end effects. Average attenuation corresponds to the average slope. The method used to determine attenuation using OTDR is described in IEC 61746-2, Calibration of optical time-domain reflectometers (OTDR)—Part 2: OTDR for multimode fibers.

Reference Primary Coating.

In measurements of in situ glass transition temperature ($T_g$) and puncture resistance, the measurement samples included a primary coating between the glass fiber and a secondary coating. The primary coating composition had the formulation given in Table 1 and is typical of commercially available primary coating compositions.

TABLE 1

Reference Primary Coating Composition

| Component | Amount |
|---|---|
| Oligomeric Material | 50.0 wt % |
| SR504 | 46.5 wt % |
| NVC | 2.0 wt % |
| TPO | 1.5 wt % |
| Irganox 1035 | 1.0 pph |
| 3-Acryloxypropyl trimethoxysilane | 0.8 pph |
| Pentaerythritol tetrakis (3-mercaptopropionate) | 0.032 pph | where the oligomeric material was prepared as described herein from H12MDI, HEA, and PPG4000 using a molar ratio n:m:p=3.5:3.0:2.0, SR504 is ethoxylated(4)nonylphenol acrylate (available from Sartomer), NVC is N-vinylcaprolactam (available from Aldrich), TPO (a photoinitiator) is (2,4,6-trimethylbenzoyl)-diphenyl phosphine oxide (available from BASF), Irganox 1035 (an antioxidant) is benzenepropanoic acid, 3,5-bis(1,1-dimethylethyl)-4-hydroxythiodi-2,1-ethanediyl ester (available from BASF), 3-acryloxypropyl trimethoxysilane is an adhesion promoter (available from Gelest), and pentaerythritol tetrakis(3-mercaptopropionate) (also known as tetrathiol, available from Aldrich) is a chain transfer agent. The concentration unit "pph" refers to an amount relative to a base composition that includes all monomers, oligomers, and photoinitiators. For example, a concentration of 1.0 pph for Irganox 1035 corresponds to 1 g Irganox 1035 per 100 g combined of oligomeric material, SR504, NVC, and TPO.

The oligomeric material was prepared by mixing H12MDI (4,4'-methylene bis(cyclohexyl isocyanate)), dibutyltin dilaurate and 2,6-di-tert-butyl-4 methylphenol at room temperature in a 500 mL flask. The 500 mL flask was equipped with a thermometer, a $CaCl_2$) drying tube, and a stirrer. While continuously stirring the contents of the flask, PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C. to 75° C. for about 1 to 1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 $cm^{-1}$. The flask was removed from the oil bath and its contents were allowed to cool to below 65° C. Addition of supplemental HEA was conducted to insure complete quenching of isocyanate groups. The supplemental HEA was added dropwise over 2-5 minutes using an addition funnel. After addition of the supplemental HEA, the flask was returned to the oil bath and its contents were again heated to about 70° C. to 75° C. for about 1 to 1½ hours. FTIR analysis was conducted on the reaction mixture to assess the presence of isocyanate groups and the process was repeated until enough supplemental HEA was added to fully react any unreacted isocyanate groups. The reaction was deemed complete when no appreciable isocyanate stretching intensity was detected in the FTIR measurement.

Secondary Coating—Compositions.

A comparative curable secondary coating composition (A) and three representative curable secondary coating compositions (SB, SC, and SD) within the score of the disclosure are listed in Table 2.

TABLE 2

Secondary Coating Compositions

| Component | Composition | | | |
|---|---|---|---|---|
| | A | SB | SC | SD |
| PE210 (wt %) | 15.0 | 15.0 | 15.0 | 15.0 |
| M240 (wt %) | 72.0 | 72.0 | 72.0 | 62.0 |
| M2300 (wt %) | 10.0 | — | — | — |
| M3130 (wt %) | — | 10.0 | — | — |
| M370 (wt %) | — | — | 10.0 | 10.0 |
| TPO (wt %) | 1.5 | 1.5 | 1.5 | 1.5 |
| Irgacure 184 (wt %) | 1.5 | 1.5 | 1.5 | 1.5 |
| Irganox 1035 (pph) | 0.5 | 0.5 | 0.5 | 0.5 |
| DC-190 (pph) | 1.0 | 1.0 | 1.0 | 1.0 |

PE210 is bisphenol-A epoxy diacrylate (available from Miwon Specialty Chemical, Korea), M240 is ethoxylated (4) bisphenol-A diacrylate (available from Miwon Specialty Chemical, Korea), M2300 is ethoxylated (30) bisphenol-A diacrylate (available from Miwon Specialty Chemical, Korea), M3130 is ethoxylated (3) trimethylolpropane triacrylate (available from Miwon Specialty Chemical, Korea), TPO (a photoinitiator) is (2,4,6-trimethylbenzoyl)diphenyl phosphine oxide (available from BASF), Irgacure 184 (a photoinitiator) is 1-hydroxycyclohexylphenyl ketone (available from BASF), Irganox 1035 (an antioxidant) is benzenepropanoic acid, 3,5-bis(1,1-dimethylethyl)-4-hydroxythiodi-2,1-ethanediyl ester (available from BASF). DC190 (a slip agent) is silicone-ethylene oxide/propylene oxide copolymer (available from Dow Chemical). The concentration unit "pph" refers to an amount relative to a base composition that includes all monomers and photoinitiators. For example, for secondary coating composition A, a concentration of 1.0 pph for DC-190 corresponds to 1 g DC-190 per 100 g combined of PE210, M240, M2300, TPO, and Irgacure 184.

Secondary Coatings—Tensile Properties.

The Young's modulus, tensile strength at yield, yield strength, and elongation at yield of secondary coatings made from secondary compositions A, SB, SC, and SD were measured using the technique described above. The results are summarized in Table 3.

TABLE 3

Tensile Properties of Secondary Coatings

| Property | Secondary Composition | | | |
|---|---|---|---|---|
| | A | SB | SC | SD |
| Young's Modulus (MPa) | 2049 | 2532 | 2653 | 2776 |
| Tensile Strength (MPa) | 86.09 | 75.56 | 82.02 | 86.08 |
| Yield Strength (MPa) | 48.21 | 61.23 | 66.37 | 70.05 |
| Elongation at yield (%) | 4.60 | 4.53 | 4.76 | 4.87 |

The results show that secondary coatings prepared from compositions SB, SC, and SD exhibited higher Young's modulus and higher yield strength than the secondary coating prepared from comparative composition A. The higher values represent improvements that make secondary coatings prepared for the curable coating compositions disclosed herein better suited for reduced-diameter multimode optical fibers. More specifically, the higher values enable use of thinner secondary coatings on multimode optical fibers without sacrificing performance. Thinner secondary coatings reduce the overall diameter of the optical fiber and provide higher fiber counts in cables of a given cross-sectional area.

The Young's modulus and/or in situ modulus of secondary coatings prepared as cured products from the curable secondary coating compositions disclosed herein is greater than 1600 MPa, or greater than 1800 MPa, or greater than 2000 MPa, or greater than 2200 MPa, or greater than 2500 MPa, or greater than 2600 MPa, or greater than 2700 MPa, or in the range from 1600 MPa to 3000 MPa, or in the range from 1800 MPa to 2800 MPa, or in the range from 2000 MPa to 2800 MPa, or in the range from 2400 MPa to 2800 MPa.

The yield strength of secondary coatings prepared as cured products from the curable secondary coating compositions disclosed herein is greater than 55 MPa, or greater than 60 MPa, or greater than 65 MPa, or greater than 70 MPa, or in the range from 55 MPa to 75 MPa, or in the range from 60 MPa to 70 MPa.

In an embodiment, the secondary coatings prepared from the curable secondary coating compositions disclosed herein have a Young's modulus and/or in situ modulus greater than 2200 MPa and a yield strength greater than 55 MPa. In another embodiment, the secondary coatings prepared from the curable secondary coating compositions disclosed herein have a Young's modulus and/or in situ modulus greater than 2500 MPa and a yield strength greater than 60 MPa. In a further embodiment, the secondary coatings prepared from the curable secondary coating compositions disclosed herein have a Young's modulus and/or in situ modulus greater than 2600 MPa and a yield strength greater than 65 MPa.

Secondary Coatings—Properties—In Situ Glass Transition Temperature ($T_g$).

The in situ glass transition temperature of two fiber samples were determined. Each fiber sample included a glass fiber with a diameter of 125 μm and the reference primary coating described above (with thickness 32.5 μm formed in direct contact with the glass fiber). One fiber sample included a secondary coating formed from comparative curable secondary composition A and the other fiber sample included a secondary coating formed from curable secondary composition SD. Each secondary coating composition was in direct contact with the reference primary coating and had a thickness of 26.0 μm.

The glass transition temperatures of the two fiber samples were measured according to the procedure described above. The results indicated that (1) the in situ glass transition temperature of the reference primary coating was approximately −50° C. in both fiber samples; (2) the in situ glass transition temperature of the secondary coating formed from the comparative curable secondary coating composition A was about 74° C.; and (3) the in situ glass transition temperature of the secondary coating formed from curable secondary coating composition SD was about 113° C. A significantly higher in situ glass transition temperature is observed for secondary coatings formed from the curable secondary coating compositions disclosed herein. A higher in situ glass transition temperature is advantageous because it facilitates stripping of the coating from the glass fiber during splicing and connectorizing applications.

The in situ glass transition temperature of secondary coatings formed as cured products of the curable secondary coating compositions disclosed herein is greater than 80° C., or greater than 90° C., or greater than 100° C., or greater than 110° C., or in the range from greater than 80° C. to 125° C., or in the range from greater than 85° C. to 120° C., or in the range from greater than 90° C. to 110° C.

Secondary Coatings—Properties—Puncture Resistance.

Figure 6:
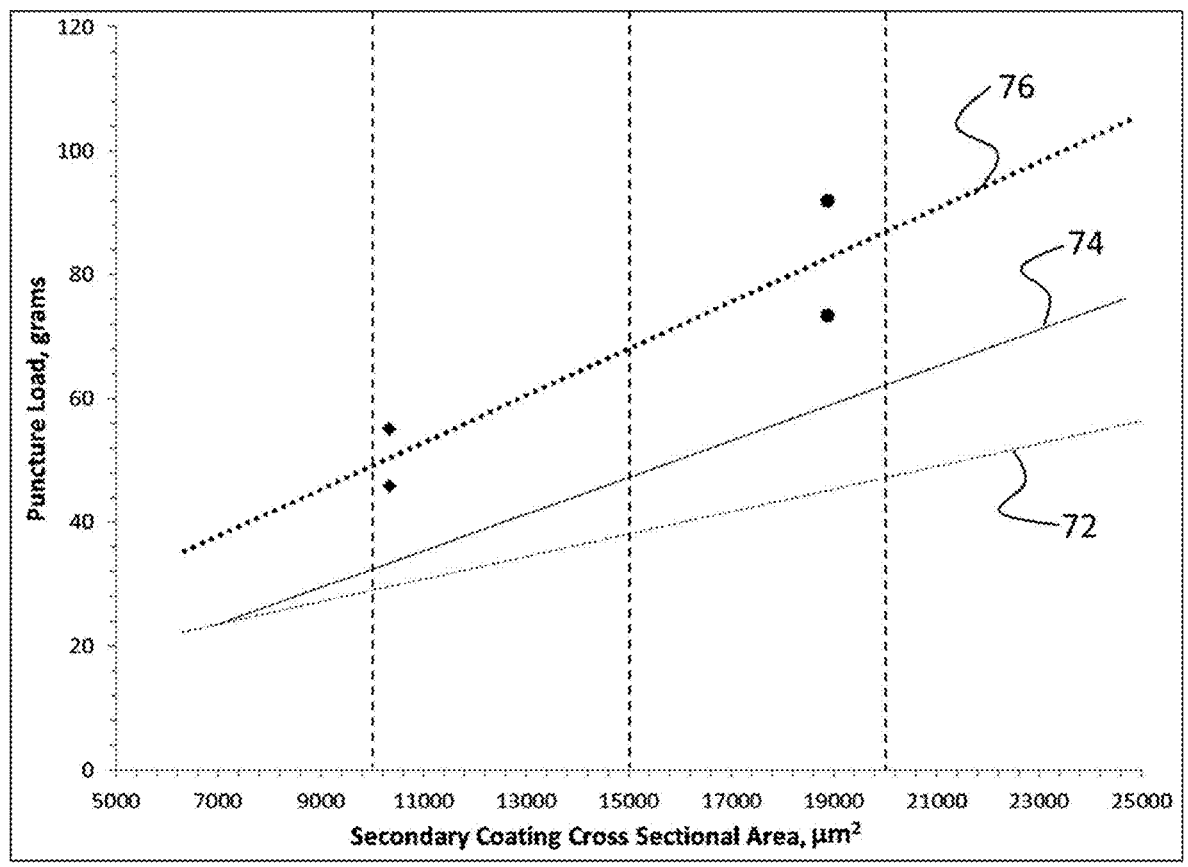
FIG. 6 shows the dependence of puncture load on cross-sectional area for three secondary coatings.

The puncture resistance of secondary coatings made from comparative curable secondary coating composition A, a commercial curable secondary coating composition (CPC6e) from a commercial vendor (DSM Desotech) having a proprietary composition, and curable secondary coating composition SD was determined according to the method described above. Several fiber samples with each of the three secondary coatings were prepared. Each fiber sample included a glass fiber with a diameter of 125 μm, a primary coating formed from the reference primary coating composition listed in Table 1, and one of the secondary coatings. The thicknesses of the primary coating and secondary coating were adjusted to vary the cross-sectional area of the secondary coating as shown in FIG. 6. The ratio of the thickness of the secondary coating to the thickness of the primary coating was maintained at about 0.8 for all samples.

Fiber samples with a range of thicknesses were prepared for each of the secondary coatings to determine the dependence of puncture load on the thickness of the secondary coating. One strategy for achieving higher fiber count in cables is to reduce the thickness of the secondary coating. As the thickness of the secondary coating is decreased, however, its performance diminishes and its protective function is compromised. Puncture resistance is a measure of the protective function of a secondary coating. A secondary coating with a high puncture resistance withstands greater impact without failing and provides better protection for the glass fiber.

The puncture load as a function of cross-sectional area for the three coatings is shown in FIG. 6. Cross-sectional area is selected as a parameter for reporting puncture load because an approximately linear correlation of puncture load with cross-sectional area of the secondary coating was observed. Traces 72, 74, and 76 shows the approximate linear dependence of puncture load on cross-sectional area for the comparative secondary coatings obtained by curing the comparative CPC6e secondary coating composition, the comparative curable secondary coating composition A, and curable secondary coating composition SD; respectively.

The vertical dashed lines are provided as guides to the eye at cross-sectional areas of 10000 µm², 15000 µm², and 20000 µm² as indicated.

The CPC6e secondary coating depicted in Trace 72 corresponds to a conventional secondary coating known in the art. The comparative secondary coating A depicted in Trace 74 shows an improvement in puncture load for high cross-sectional areas. The improvement, however, diminishes as the cross-sectional area decreases. This indicates that a secondary coating obtained as a cured product from comparative curable secondary coating composition A is unlikely to be suitable for low diameter, high fiber count applications. Trace 76, in contrast, shows a significant increase in puncture load for the secondary coating obtained as a cured product from curable secondary coating composition SD. At a cross-sectional area of 7000 µm², for example, the puncture load of the secondary coating obtained from curable secondary coating composition SD is 50% or more greater than the puncture load of either of the other two secondary coatings.

The puncture load of secondary coatings formed as cured products of the curable secondary coating compositions disclosed herein at a cross-sectional area of 10000 µm² is greater than 36 g, or greater than 40 g, or greater than 44 g, or greater than 48 g, or in the range from 36 g to 52 g, or in the range from 40 g to 48 g. The puncture load of secondary coatings formed as cured products of the curable secondary coating compositions disclosed herein at a cross-sectional area of 15000 µm² is greater than 56 g, or greater than 60 g, or greater than 64 g, or greater than 68 g, or in the range from 56 g to 72 g, or in the range from 60 g to 68 g. The puncture load of secondary coatings formed as cured products of the curable secondary coating compositions disclosed herein at a cross-sectional area of 20000 µm² is greater than 68 g, or greater than 72 g, or greater than 76 g, or greater than 80 g, or in the range from 68 g to 92 g, or in the range from 72 g to 88 g. Embodiments include secondary coatings having any combination of the foregoing puncture loads.

As used herein, normalized puncture load refers to the ratio of puncture load to cross-sectional area. The puncture load of secondary coatings formed as cured products of the curable secondary coating compositions disclosed herein have a normalized puncture load greater than $3.2 \times 10^{-4}$ g/µm², or greater than $3.6 \times 10^{-4}$ g/µm², or greater than $4.0 \times 10^{-4}$ g/µm², or greater than $4.4 \times 10^{-4}$ g/µm², or greater than $4.8 \times 10^{-4}$ g/µm², or in the range from $3.2 \times 10^{-4}$ g/µm² to $5.6 \times 10^{-4}$ g/µm², or in the range from $3.6 \times 10^{-4}$ g/µm² to $5.2 \times 10^{-4}$ g/µm², or in the range from $4.0 \times 10^{-4}$ g/µm² to $4.8 \times 10^{-4}$ g/µm².

Coatings—Modeled Results.

The experimental examples and principles disclosed herein indicate that by varying the mole numbers n, m, and p, it is possible to control the relative amount of di-adduct compound in the oligomer as well as the properties of cured films formed from the primary coating compositions over a wide range, including the ranges specified herein for Young's modulus and in situ modulus. Similarly, variations in the type and concentration of different monomers in the secondary composition leads to variations in the Young's modulus over the range disclosed herein. Curing dose is another parameter that can be used to vary modulus of primary and secondary coatings formed from the curable compositions disclosed herein.

To examine the effect of the thickness and modulus of the primary and secondary coatings on transmission of a radial force to a glass fiber, a series of modeled examples was considered. In the model, a radial external load P was applied to the surface of the secondary coating of an optical fiber and the resulting load at the surface of the glass fiber was calculated. The glass fiber was modeled with a Young's modulus of 73.1 GPa (consistent with silica glass) and a diameter of 125 µm. The Poisson ratios $v_p$ and $v_s$ of the primary and secondary coatings were fixed at 0.48 and 0.33, respectively. A comparative sample C1 and six samples M1-M6 in accordance with the present disclosure were considered. The comparative sample included primary and secondary coatings with thicknesses and moduli consistent with optical fibers known in the art. Samples M1-M6 are examples with reduced thicknesses of the primary and secondary coatings. Parameters describing the configurations of the primary and secondary coatings are summarized in Table 4.

TABLE 4

Coating Properties of Modeled Optical Fibers

| Sample | Primary Coating | | | Secondary Coating | | |
|---|---|---|---|---|---|---|
| | In Situ Modulus (MPa) | Diameter (µm) | Thickness (µm) | Young's Modulus (MPa) | Diameter (µm) | Thickness (µm) |
| C1 | 0.20 | 190 | 32.5 | 1600 | 242 | 26.0 |
| M1 | 0.14 | 167 | 21.0 | 1900 | 200 | 16.5 |
| M2 | 0.12 | 161 | 18.0 | 1900 | 190 | 14.5 |
| M3 | 0.10 | 155 | 15.0 | 2000 | 180 | 12.5 |
| M4 | 0.09 | 150 | 12.5 | 2300 | 170 | 10.0 |
| M5 | 0.12 | 145 | 15.0 | 2200 | 170 | 12.5 |
| M6 | 0.11 | 138 | 14.0 | 2200 | 160 | 11.0 |

Table 5 summarizes the load P1 at the outer surface of the glass fiber as a fraction of load P applied to the surface of the secondary coating. The ratio P1/P is referred to herein as the load transfer parameter and corresponds to the fraction of external load P transmitted through the primary and secondary coatings to the surface of the glass fiber. The load P is a radial load and the load transfer parameter P1/P was calculated from a model based on Eqs. (7)-(9):

$$\frac{P_1}{P} = \frac{4(1 - v_p)(1 - v_s)}{\{A + B\}} \text{ where} \quad (7)$$

$$A = \left( \frac{E_s(1 + v_p)(1 - 2v_p)\left(1 - (r_4/r_5)^2\right)\left(1 - (r_5/r_6)^2\right)}{E_p(1 + v_s)} \right) \text{ and} \quad (8)$$

$$B = \left( \left(1 - 2v_p(r_4/r_5)^2 + (r_4/r_5)^2\right)\left(1 - 2v_s(r_5/r_6)^2 + (r_5/r_6)^2\right) \right) \quad (9)$$

In Eqs. (7)-(9), $v_p$ and $v_s$ are the Poisson's ratios of the primary and secondary coatings, $r_4$ is the outer radius of the glass fiber, $r_5$ is the outer radius of the primary coating, $r_6$ is the outer radius of the secondary coating, $E_p$ is the in situ modulus of the primary coating, and $E_s$ is the Young's modulus of the secondary coating. The scaled load transfer parameter P1/P (scaled) in Table 5 corresponds to the ratio P1/P for each sample relative to comparative sample C1.

TABLE 5

Load Transfer Parameter (P1/P) at Surface of Glass Fiber

| Sample | P1/P | P1/P (scaled) |
|---|---|---|
| C1 | 0.0178 | 1.00 |
| M1 | 0.0171 | 0.97 |
| M2 | 0.0175 | 0.98 |

TABLE 5-continued

Load Transfer Parameter (P1/P) at Surface of Glass Fiber

| Sample | P1/P | P1/P (scaled) |
|---|---|---|
| M3 | 0.0172 | 0.97 |
| M4 | 0.0170 | 0.95 |
| M5 | 0.0167 | 0.94 |
| M6 | 0.0166 | 0.94 |

The modeled examples show that despite smaller coating thicknesses, optical fibers having primary and secondary coatings as described herein exhibit a reduction in the force experienced by a glass fiber relative to a comparative optical fiber having conventional primary and secondary coatings with conventional thicknesses. The resulting reduction in overall size of the optical fibers described herein enables higher fiber count in cables of a given size (or smaller cable diameters for a given fiber count) without increasing the risk of damage to the glass fiber caused by external forces.

The scaled load transfer parameter $P_1/P$ (scaled) of the secondary coating is less than 0.99, or less than 0.97, or less than 0.95. The load transfer parameter $P_1/P$ of the secondary coating is less than 0.0200, or less than 0.0180, or less than 0.0178, or less than 0.0176, or less than 0.0174, or less than 0.0172, or less than 0.0170, or less than 0.0168, or in the range from 0.0160-0.0180, or in the range from 0.0162-0.0179, or in the range from 0.0164-0.0178, or in the range from 0.0166-0.0177, or in the range from 0.0168-0.0176.

Multimode Optical Fibers.

Configurations of several representative multimode optical fibers are shown in Table 6 below and labeled as Examples 1-5. Table 6 lists the radius $r_4$ of the glass fiber; the in situ modulus, thickness and radius $r_5$ of the primary coating; and the in situ modulus, thickness, and radius $r_6$ of the secondary coating. Primary and secondary coatings with the listed in situ modulus values are obtainable from the curable primary and secondary coating compositions described herein. Several of the examples include a tertiary coating. The tertiary coating has the same in situ modulus as the secondary coating. Table 6 also lists a spring constant $\chi_p$ for the primary coating. The spring constant $\chi_p$ is computed from Eq. (10)

$$\chi_p = \frac{E_p d_g}{t_p} \quad (10)$$

where $E_p$ is the in situ modulus of the primary coating, $t_p$ is the thickness of the primary coating, and $d_g$ is the diameter $2r_4$ of the glass fiber. The spring constant is a phenomenological parameter that describes the extent to which the primary coating mitigates coupling of the secondary coating to the glass fiber. (See "Relationship of Mechanical Characteristics of Dual Coated Single Mode Optical Fibers and Microbending Loss", by J. Baldauf et al., IEICE Transactions on Communications, Vol. E76-B, No. 4, pp. 352-357 (1993)) In the phenomenological model, the buffering effect of the primary coating is modeled as a spring with the spring constant given in Eq. (10). A low spring constant leads to greater resistance to microbending. The tradeoff of in situ modulus and thickness in establishing the resistance of the primary coating to microbending is reflected in the spring constant.

Conventional optical fibers have a glass fiber with a radius $r_4$ of approximately 62.5 μm and an outer radius $r_6$ of approximately 121 μm (in embodiments without a tertiary coating) or $r_7$ of approximately 125 μm (in embodiments with a tertiary coating). Table 6 lists representative multimode fibers having a glass fiber with a conventional radius $r_4$ of 62.5 μm, various thicknesses of the primary coating, and an outer radius $r_6$ of 100 μm or an outer radius $r_7$ of 104 μm that is reduced relative to the conventional outer radius. FIG. 7 shows a measured relative refractive index profile of a representative multimode optical fiber having a radius $r_4$ of 62.5 μm and a radius $r_6$ of 100 μm (measured with an IFA-100 Relative Refractive Index Profiler). FIG. 8 shows the result of a fit of the core region of the refractive index profile plotted in FIG. 7 using an α-profile and least squares minimization method described above for a representative multimode optical fiber having a radius $r_4$ of 62.5 μm and a radius $r_6$ of 100 μm. The fit was performed over radial positions extending from 3 μm to 22 μm, and the values of $\Delta_{1max}$, α, and $r_1$ are listed in Table 7. All of the representative multimode fibers have outer diameters that are reduced relative to conventional fibers and all exhibit improved microbending resistance relative to conventional fibers. In Table 6, $E_p$ is the in situ modulus of the primary coating and $E_s$ is the in situ modulus of the secondary coating. The in situ modulus of the tertiary coating is the same as the in situ modulus of the secondary coating.

TABLE 6

| | | Ex. 1 | Ex. 2 | Ex. 3 | Ex. 4 | Ex. 5 |
|---|---|---|---|---|---|---|
| Radius of glass fiber (μm) | $r_4$ | 62.5 | 62.5 | 62.5 | 62.5 | 62.5 |
| Primary modulus (MPa) | $E_p$ | 0.33 | 0.30 | 0.20 | 0.20 | 0.33 |
| Primary radius (μm) | $r_5$ | 87.5 | 87.5 | 87.5 | 77.5 | 84.5 |
| Primary thickness (μm) | $r_5 - r_4$ | 25 | 25 | 25 | 15 | 22 |
| Secondary Modulus (MPa) | $E_s$ | 2050 | 2200 | 2500 | 2650 | 2775 |
| Secondary radius (μm) | $r_6$ | 100 | 100 | 100 | 100 | 100 |
| Secondary thickness (μm) | $r_6 - r_5$ | 12.5 | 12.5 | 12.5 | 22.5 | 15.5 |
| Tertiary radius (μm) | $r_7$ | — | 104 | 104 | 104 | — |
| Tertiary thickness (μm) | $r_7 - r_6$ | — | 4 | 4 | 4 | — |
| Spring constant (MPa) | $\chi_p$ | 1.65 | 1.50 | 1.00 | 1.67 | 1.88 |

Preferred values of the spring constant $\chi_p$ are less than 1.90 MPa, or less than 1.70 MPa, or less than 1.50 MPa, or less than 1.10 MPa, or in the range from 0.90 MPa to 1.90 MPa, or in the range from 1.00 MPa to 1.80 MPa, or in the range from 1.10 MPa to 1.70 MPa.

Measurements of OFL bandwidth and OTDR attenuation were made on a representative multimode fiber having a radius $r_6$=100 μm and a comparative multimode fiber having a standard radius $r_6$=121 μm. Table 7 shows relative refractive index values for the glass fiber and properties for the primary and secondary coatings of the two multimode optical fibers. Table 8 shows attenuation as determined by OTDR at 850 nm and 1300 nm, as well as OFL bandwidth at 850 nm and 1300 nm, and minEMBc at 850 nm for each multimode optical fiber.

TABLE 7

|  |  | Representative Multimode Optical Fiber | Comparative Multimode Optical Fiber |
|---|---|---|---|
| Radius of core (μm) | $r_1$ | 23.53 | 23.53 |
| Core Alpha | α | 2.122 | 2.122 |
| Core Index (%) | $\Delta_{1max}$ | 1.00 | 1.00 |
| Radius of inner cladding (μm) | $r_2$ | 25.16 | 25.16 |
| Index of inner cladding (%) | $\Delta_2$ | 0.01 | 0.01 |
| Thickness of inner cladding (μm) | $r_2 - r_1$ | 1.63 | 1.63 |
| Radius of depressed index cladding (μm) | $r_3$ | 31.63 | 31.63 |
| Index of depressed index cladding (%) | $\Delta_3$ | −0.40 | −0.40 |
| Thickness of depressed index cladding (μm) | $r_3 - r_2$ | 6.47 | 6.47 |
| Trench volume (%-μm²) | $V_3$ | 143.8 | 143.8 |
| Radius of outer cladding (μm) | $r_4$ | 62.5 | 62.5 |
| Index of outer cladding (%) | $\Delta_4$ | 0.0 | 0.0 |
| Primary modulus (MPa) | $E_p$ | 0.2 | 0.2 |
| Primary radius (μm) | $r_5$ | 80.0 | 95.0 |
| Primary thickness (μm) | $r_5 - r_4$ | 17.5 | 32.5 |
| Secondary Modulus (MPa) | $E_s$ | 2000 | 2000 |
| Secondary radius (μm) | $r_6$ | 100.0 | 121.0 |
| Secondary thickness (μm) | $r_6 - r_5$ | 20.0 | 26.0 |
| Spring constant (MPa) | $\chi_p$ | 0.71 | 0.38 |

TABLE 8

|  | Representative Multimode Optical Fiber | Comparative Multimode Optical Fiber |
|---|---|---|
| Length (m) | 4000 | 5000 |
| OTDR attenuation at 850 nm (dB/km) | 2.336 | 2.210 |
| OTDR attenuation at 1300 nm (dB/km) | 0.542 | 0.458 |
| Overfilled launch bandwidth at 850 nm (MHz-km) | 5467 | 4692 |
| Overfilled launch bandwidth at 1300 nm (MHz-km) | 558 | 530 |
| minEMBc at 850 nm (MHz-km) | 4411 | 3611 |

FIG. 9 shows attenuation of the representative multimode optical fiber with the attributes listed in Table 8 over a wavelength range of 800 nm to 1600 nm. The representative multimode optical fiber was deployed on a measurement spool and attenuation was measured using a limited phase space launch according to FOTP 78—Procedure to Measure Spectral Attenuation of Multimode Fibers.

Clause 1 of the description discloses:
An optical fiber comprising:
a multimode glass fiber, the multimode glass fiber including a core region with a radius $r_1$ in the range from 17.5 μm to 32.5 μm and a cladding region with a radius $r_4$ greater than or equal to 60.0 μm;
a primary coating with a radius $r_5$ surrounding and directly adjacent to the cladding region, the primary coating having a thickness $r_5-r_4$ less than 30.0 μm and an in situ modulus less than 0.30 MPa; and
a secondary coating with a radius $r_6$ less than or equal to 110.0 μm surrounding and directly adjacent to the primary coating; the secondary coating having a thickness $r_6-r_5$ less than or equal to 30.0 μm and a normalized puncture load greater than $3.6\times10^{-4}$ g/μm²;
wherein the optical fiber has a minimum effective modal bandwidth (minEMB) greater than 2000 MHz-km at one or more wavelengths selected from the group consisting of 850 nm, 980 nm, and 1060 nm.

Clause 2 of the description discloses:
The optical fiber of clause 1, wherein the radius $r_1$ is in the range from 17.5 μm to 27.5 μm.

Clause 3 of the description discloses:
The optical fiber of clause 1 or 2, wherein the core region has a relative refractive index $\Delta_1$ described by an α-profile with α in the range from 1.90 to 2.30.

Clause 4 of the description discloses:
The optical fiber of clause 3, wherein the relative refractive index $\Delta_1$ has a maximum $\Delta_{1max}$ in the range from 0.50% to 1.40%.

Clause 5 of the description discloses:
The optical fiber of any of clauses 1-4, wherein the cladding region comprises an inner cladding region with a radius $r_2$ and a relative refractive index $\Delta_2$ in the range from −0.20% to 0.20%, a depressed-index cladding region with a radius $r_3$ and a relative refractive index $\Delta_3$ with a minimum relative refractive index $\Delta_{3min}$ in the range from −0.10% to −0.80%, and an outer cladding region with the radius $r_4$ and a relative refractive index $\Delta_4$ in the range from −0.20% to 0.20%.

Clause 6 of the description discloses:
The optical fiber of clause 5, wherein the thickness $r_2-r_1$ of the inner cladding region is in the range from 0.3 μm to 6.0 μm.

Clause 7 of the description discloses:
The optical fiber of clause 5 or 6, wherein the thickness $r_3-r_2$ of the depressed-index cladding region is in the range from 1.0 μm to 8.0 μm.

Clause 8 of the description discloses:
The optical fiber of any of clauses 1-7, wherein the radius $r_5$ is less than or equal to 90.0 μm.

Clause 9 of the description discloses:
The optical fiber of any of clauses 1-7, wherein the radius $r_5$ is less than or equal to 85.0 μm.

Clause 10 of the description discloses:
The optical fiber of any of clauses 1-9, wherein the thickness $r_5-r_4$ is less than or equal to 25.0 μm.

Clause 11 of the description discloses:
The optical fiber of any of clauses 1-10, wherein the primary coating has an in situ modulus less than 0.20 MPa.

Clause 12 of the description discloses:
The optical fiber of any of clauses 1-11, wherein the primary coating is a cured product of a primary coating composition comprising a polyether urethane diacrylate compound having the molecular formula having the formula

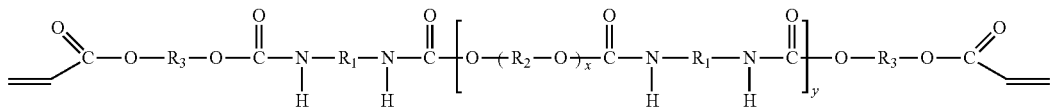

and a di-adduct compound having the formula

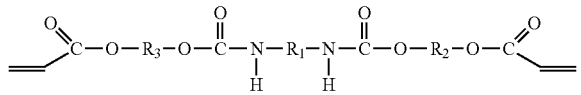

wherein $R_1$, $R_2$, and $R_3$ comprise alkylene groups.

Clause 13 of the description discloses:
The optical fiber of any of clauses 1-12, wherein the radius $r_6$ is less than or equal to 100.0 µm.

Clause 14 of the description discloses:
The optical fiber of clause 13, wherein the radius $r_4$ is less than or equal to 45.0 µm.

Clause 15 of the description discloses:
The optical fiber of any of clauses 1-14, wherein the thickness $r_6-r_5$ is less than or equal to 25.0 µm.

Clause 16 of the description discloses:
The optical fiber of clause 15, wherein the thickness $r_5-r_4$ is less than or equal to 20.0 µm.

Clause 17 of the description discloses:
The optical fiber of any of clauses 1-16, wherein the secondary coating has a normalized puncture load greater than $4.0 \times 10^{-4}$ g/µm$^2$.

Clause 18 of the description discloses:
The optical fiber of any of clauses 1-16, wherein the secondary coating has a normalized puncture load greater than $4.4 \times 10^{-4}$ g/µm$^2$.

Clause 19 of the description discloses:
The optical fiber of any of clauses 1-16, wherein the secondary coating has a normalized puncture load greater than $4.8 \times 10^{-4}$ g/µm$^2$.

Clause 20 of the description discloses:
The optical fiber of any of clauses 1-19, wherein the secondary coating has a scaled load transfer parameter $P_1/P$ (scaled) less than 0.97.

Clause 21 of the description discloses:
The optical fiber of any of clauses 1-19, wherein the secondary coating has a load transfer parameter $P_1/P$ less than 0.0178.

Clause 22 of the description discloses:
The optical fiber of any of clauses 1-21, wherein the secondary coating is a cured product of a secondary coating composition comprising a triacrylate monomer in an amount in the range from 2.0 wt % to 25 wt %, the triacrylate monomer comprising an alkoxylated trimethylolpropane triacrylate monomer having a degree of alkoxylation in the range from 2 to 16 or a tris[(acryloyloxy)alkyl] isocyanurate monomer.

Clause 23 of the description discloses:
The optical fiber of any of clauses 1-22, wherein the secondary coating has a Young's modulus greater than 1600 MPa.

Clause 24 of the description discloses:
The optical fiber of any of clauses 1-23, wherein the optical fiber has a numerical aperture greater than 0.160 at 850 nm.

Clause 25 of the description discloses:
The optical fiber of any of clauses 1-23, wherein the optical fiber has a numerical aperture greater than 0.180 at 850 nm.

Clause 26 of the description discloses:
The optical fiber of any of clauses 1-25, wherein the optical fiber has a minimum effective modal bandwidth (minEMB) greater than 4700 MHz-km at one or more wavelengths selected from the group consisting of 850 nm, 980 nm, and 1060 nm.

Clause 27 of the description discloses:
The optical fiber of any of clauses 1-25, wherein the optical fiber has a minimum effective modal bandwidth (minEMB) greater than 8000 MHz-km at one or more wavelengths selected from the group consisting of 850 nm, 980 nm, and 1060 nm.

Clause 28 of the description discloses:
The optical fiber of any of clauses 1-27, wherein the optical fiber has a macrobend loss at 850 nm, when wrapped around a mandrel having a diameter of 15 mm, less than 0.20 dB/turn.

Clause 29 of the description discloses:
The optical fiber of any of clauses 1-27, wherein the optical fiber has a macrobend loss at 850 nm, when wrapped around a mandrel having a diameter of 15 mm, less than 0.10 dB/turn.

Clause 30 of the description discloses:
The optical fiber of any of clauses 1-27, wherein the optical fiber has a macrobend loss at 850 nm, when wrapped around a mandrel having a diameter of 30 mm, less than 0.10 dB/turn.

Clause 31 of the description discloses:
The optical fiber of any of clauses 1-27, wherein the optical fiber has a macrobend loss at 850 nm, when wrapped around a mandrel having a diameter of 30 mm, less than 0.05 dB/turn.

Clause 32 of the description discloses:
The optical fiber of any of clauses 1-27, wherein the optical fiber has a macrobend loss at 1300 nm, when wrapped around a mandrel having a diameter of 15 mm, less than 0.50 dB/turn.

Clause 33 of the description discloses:
The optical fiber of any of clauses 1-27, wherein the optical fiber has a macrobend loss at 1300 nm, when wrapped around a mandrel having a diameter of 15 mm, less than 0.25 dB/turn.

Clause 34 of the description discloses:
The optical fiber of any of clauses 1-27, wherein the optical fiber has a macrobend loss at 1300 nm, when wrapped around a mandrel having a diameter of 30 mm, less than 0.20 dB/turn.

Clause 35 of the description discloses:
The optical fiber of any of clauses 1-27, wherein the optical fiber has a macrobend loss at 1300 nm, when wrapped around a mandrel having a diameter of 30 mm, less than 0.15 dB/turn.

Clause 36 of the description discloses:
The optical fiber of any of clauses 1-27, wherein the optical fiber has an average attenuation, as measured by OTDR, at 850 nm less than 10.0 dB/km.

Clause 37 of the description discloses:
The optical fiber of any of clauses 1-27, wherein the optical fiber has an average attenuation, as measured by OTDR, at 850 nm less than 6.0 dB/km.

Clause 38 of the description discloses:
The optical fiber of any of clauses 1-27, wherein the optical fiber has an average attenuation, as measured by OTDR, at 1300 nm less than 8.0 dB/km.

Clause 39 of the description discloses:
The optical fiber of any of clauses 1-27, wherein the optical fiber has an average attenuation, as measured by OTDR, at 1300 nm less than 4.0 dB/km.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising:
a multimode glass fiber, the multimode glass fiber including a core region with a radius $r_1$ in the range from 17.5 µm to 32.5 µm and a cladding region with a radius $r_4$ greater than or equal to 60.0 µm;
a primary coating with a radius $r_5$ surrounding and directly adjacent to the cladding region, the primary coating having a thickness $r_5$-$r_4$ less than 30.0 µm and an in situ modulus less than 0.30 MPa; and
a secondary coating with a radius $r_6$ less than or equal to 110.0 µm surrounding and directly adjacent to the primary coating; the secondary coating having a thickness $r_6$-$r_5$ less than or equal to 30.0 µm and a normalized puncture load greater than $3.6 \times 10^{-3}$ g/µm²;
wherein the optical fiber has a minimum effective modal bandwidth (minEMB) greater than 2000 MHz-km at one or more wavelengths selected from the group consisting of 850 nm, 980 nm, and 1060 nm.

2. The optical fiber of claim 1, wherein the core region has a relative refractive index $\Delta_1$ described by an α-profile with a in the range from 1.90 to 2.30.

3. The optical fiber of claim 2, wherein the relative refractive index $\Delta_1$ has a maximum $\Delta_{1max}$ in the range from 0.50% to 1.40%.

4. The optical fiber of claim 1, wherein the cladding region comprises an inner cladding region with a radius $r_2$ and a relative refractive index $\Delta_2$ in the range from −0.20% to 0.20%, a depressed-index cladding region with a radius $r_3$ and a relative refractive index $\Delta_3$ with a minimum relative refractive index $\Delta_{3min}$ in the range from −0.10% to −0.80%, and an outer cladding region with the radius $r_4$ and a relative refractive index $\Delta_4$ in the range from −0.20% to 0.20%.

5. The optical fiber of claim 1, wherein the radius $r_5$ is less than or equal to 85.0 µm.

6. The optical fiber of claim 1, wherein the thickness $r_5$-$r_4$ is less than or equal to 25.0 µm.

7. The optical fiber of claim 1, wherein the primary coating is a cured product of a primary coating composition comprising a polyether urethane diacrylate compound having the molecular formula having the formula

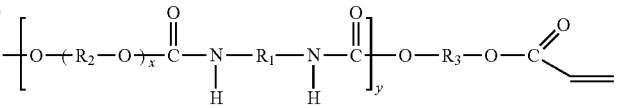

and a di-adduct compound having the formula

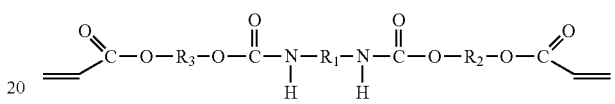

wherein $R_1$, $R_2$, and $R_3$ comprise alkylene groups.

8. The optical fiber of claim 1, wherein the radius $r_6$ is less than or equal to 100.0 µm.

9. The optical fiber of claim 8, wherein the radius $r_4$ is less than or equal to 45.0 µm.

10. The optical fiber of claim 1, wherein the thickness $r_6$-$r_5$ is less than or equal to 25.0 µm.

11. The optical fiber of claim 1, wherein the thickness $r_5$-$r_4$ is less than or equal to 20.0 µm.

12. The optical fiber of claim 1, wherein the secondary coating has a normalized puncture load greater than $4.0 \times 10^{-3}$ g/µm².

13. The optical fiber of claim 1, wherein the secondary coating has a load transfer parameter $P_1/P$ less than 0.0178.

14. The optical fiber of claim 1, wherein the secondary coating is a cured product of a secondary coating composition comprising a triacrylate monomer in an amount in the range from 2.0 wt % to 25 wt %, the triacrylate monomer comprising an alkoxylated trimethylolpropane triacrylate monomer having a degree of alkoxylation in the range from 2 to 16 or a tris[(acryloyloxy)alkyl] isocyanurate monomer.

15. The optical fiber of claim 1, wherein the secondary coating has a Young's modulus greater than 1600 MPa.

16. The optical fiber of claim 1, wherein the optical fiber has a minimum effective modal bandwidth (minEMB) greater than 4700 MHz-km at one or more wavelengths selected from the group consisting of 850 nm, 980 nm, and 1060 nm.

17. The optical fiber of claim 1, wherein the optical fiber has a macrobend loss at 850 nm, when wrapped around a mandrel having a diameter of 15 mm, less than 0.20 dB/turn.

18. The optical fiber of claim 1, wherein the optical fiber has a macrobend loss at 1300 nm, when wrapped around a mandrel having a diameter of 15 mm, less than 0.50 dB/turn.

19. The optical fiber of claim 1, wherein the optical fiber has an average attenuation, as measured by OTDR, at 850 nm less than 10.0 dB/km.

20. The optical fiber of claim 1, wherein the optical fiber has an average attenuation, as measured by OTDR, at 1300 nm less than 8.0 dB/km.

* * * * *

UNITED STATES PATENT AND TRADEMARK OFFICE
CERTIFICATE OF CORRECTION

PATENT NO. : 11,119,270 B2  
APPLICATION NO. : 16/793063  
DATED : September 14, 2021  
INVENTOR(S) : Scott Robertson Bickham et al.

Page 1 of 1

It is certified that error appears in the above-identified patent and that said Letters Patent is hereby corrected as shown below:

In the Claims

In Column 59, Line 50 (approx.), Claim 2, delete "a" and insert -- α --, therefor.

In Column 60, Line 19 (approx.), Claim 7, delete "$R_2$" and insert -- $R_3$ --, therefor.

In Column 60, Line 23 (approx.), Claim 7, delete "$R_3$comprise" and insert -- $R_3$ comprise --, therefor.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*